(12) United States Patent
Sumiyoshi

(10) Patent No.: US 10,580,155 B2
(45) Date of Patent: Mar. 3, 2020

(54) IMAGE PROCESSING APPARATUS, IMAGING DEVICE, DEVICE CONTROL SYSTEM, FREQUENCY DISTRIBUTION IMAGE GENERATION METHOD, AND RECORDING MEDIUM

(71) Applicant: Shinichi Sumiyoshi, Kanagawa (JP)

(72) Inventor: Shinichi Sumiyoshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 213 days.

(21) Appl. No.: 15/334,869

(22) Filed: Oct. 26, 2016

(65) Prior Publication Data

US 2017/0124725 A1 May 4, 2017

(30) Foreign Application Priority Data

Oct. 29, 2015 (JP) ................. 2015-212603

(51) Int. Cl.
| | | |
|---|---|---|
| *G06T 7/60* | (2017.01) | |
| *G06K 9/00* | (2006.01) | |
| *G06K 9/20* | (2006.01) | |
| *G06T 7/593* | (2017.01) | |
| *H04N 13/239* | (2018.01) | |
| *B60R 11/04* | (2006.01) | |
| *H04N 13/00* | (2018.01) | |

(52) U.S. Cl.
CPC ............... *G06T 7/60* (2013.01); *B60R 11/04* (2013.01); *G06K 9/00791* (2013.01); *G06K 9/00798* (2013.01); *G06K 9/00805* (2013.01); *G06K 9/2054* (2013.01); *G06T 7/593* (2017.01); *H04N 13/239* (2018.05); *G06T 2207/10021* (2013.01); *G06T 2207/30261* (2013.01); *H04N 2013/0081* (2013.01)

(58) Field of Classification Search
CPC . G06T 7/60; G06T 7/593; G06T 2207/30261; G06T 2207/10021; H04N 13/239; H04N 2013/0081; G06K 9/2054; G06K 9/00798; G06K 9/00805; G06K 9/00791; B60R 11/04
See application file for complete search history.

(56) References Cited

U.S. PATENT DOCUMENTS

| | | | |
|---|---|---|---|
| 7,295,697 B1 | 11/2007 | Satoh | |
| 8,950,872 B2 | 2/2015 | Hasegawa et al. | |
| 9,088,708 B2 * | 7/2015 | Lin | ........................ H04N 5/343 |
| 9,443,294 B2 | 9/2016 | Sumiyoshi | |

(Continued)

FOREIGN PATENT DOCUMENTS

| | | | | |
|---|---|---|---|---|
| EP | 2775423 A2 * | 9/2014 | ......... | G06K 9/00624 |
| JP | 3728160 | 12/2005 | | |

(Continued)

*Primary Examiner* — Richard A Hansell, Jr.
(74) *Attorney, Agent, or Firm* — Oblon, McClelland, Maier & Neustadt, L.L.P.

(57) ABSTRACT

An image processing apparatus includes a processor configured to acquire a parallax image having pixel values according to a parallax of an object in a plurality of captured images, extract first pixel values from a first area of the parallax image at a first rate, extract second pixel values from a second area of the parallax image at a second rate, and generate data indicating a parallax distribution of the object in the plurality of captured images based on the extracted first and second pixel values.

11 Claims, 33 Drawing Sheets

(56) References Cited

U.S. PATENT DOCUMENTS

| | | | |
|---|---|---|---|
| 9,443,313 B2 | 9/2016 | Muramatsu et al. | |
| 2014/0092294 A1* | 4/2014 | Iwabuchi | H04N 5/3456 348/349 |
| 2014/0269921 A1* | 9/2014 | Heyward | H04N 5/145 375/240.16 |
| 2015/0294160 A1* | 10/2015 | Takahashi | G06K 9/00791 382/104 |
| 2016/0019429 A1* | 1/2016 | Ishigaki | G06F 16/583 348/47 |
| 2016/0110906 A1* | 4/2016 | Ahuja | G06F 3/01 345/634 |

FOREIGN PATENT DOCUMENTS

| | | |
|---|---|---|
| JP | 2011-191905 | 9/2011 |
| JP | 2013-201688 | 10/2013 |
| JP | 2015-179301 | 10/2015 |
| WO | WO 2014/045471 A1 | 3/2014 |

* cited by examiner

FIG. 5

| DATA CATEGORY | DATA NAME | DETAIL |
|---|---|---|
| OBJECT DATA | POSITION | UPPER LEFT COORDINATES (x, y) IN IMAGE |
| | SIZE | OBJECT SIZE (w, h) IN IMAGE |
| | DISTANCE | DISTANCE TO SUBJECT (measured in meters) |
| | RELATIVE VELOCITY | RELATIVE VELOCITY (LATERAL X (m/frame)), DEPTH Z (m/frame) |
| | MAX PARALLAX | MAX PARALLAX OF OBJECT |
| | MIN PARALLAX | MIN PARALLAX OF OBJECT |
| OBJECT PREDICTION DATA | POSITION | UPPER LEFT COORDINATES (x, y) IN IMAGE |
| | SIZE | OBJECT SIZE (w, h) IN IMAGE |
| | DISTANCE | DISTANCE TO SUBJECT (measured in meters) |
| | MAX PARALLAX | MAX PARALLAX OF OBJECT |
| | MIN PARALLAX | MIN PARALLAX OF OBJECT |
| | WIDTH MARGIN OF PREDICTED RANGE | HALF OF WIDTH IN LEFT/RIGHT DIRECTION |
| | HEIGHT MARGIN OF PREDICTED RANGE | UP TO 1-FOLD OF HEIGHT IN UP/DOWN DIRECTION |
| OBJECT FEATURE AMOUNT | HISTOGRAM PEAK POSITION | UP TO FOUR PEAK POSITIONS |
| | PEAK-TO-PEAK DISTANCE | REAL DISTANCE BETWEEN PEAKS (m) |
| DETECTED/UNDETECTED FRAME NO. | TOTAL DETECTED FRAME NO. | TOTAL NO. OF DETECTED FRAMES (T) |
| | UNDETECTED FRAME NO. | NO. OF CONSECUTIVE UNDETECTED FRAMES (F) |
| PROBABILITY | STABILITY FLAG | STABILITY DETECTION FLAG (S) |

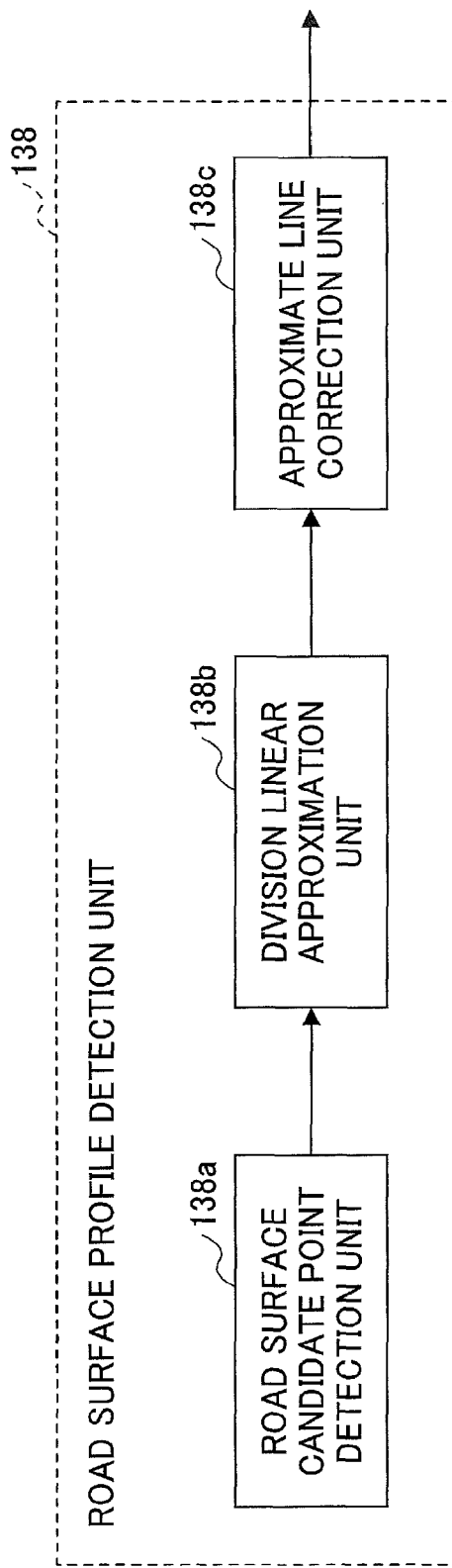

○ PIXEL BEING EXTRACTED

△ PIXEL NOT EXTRACTED

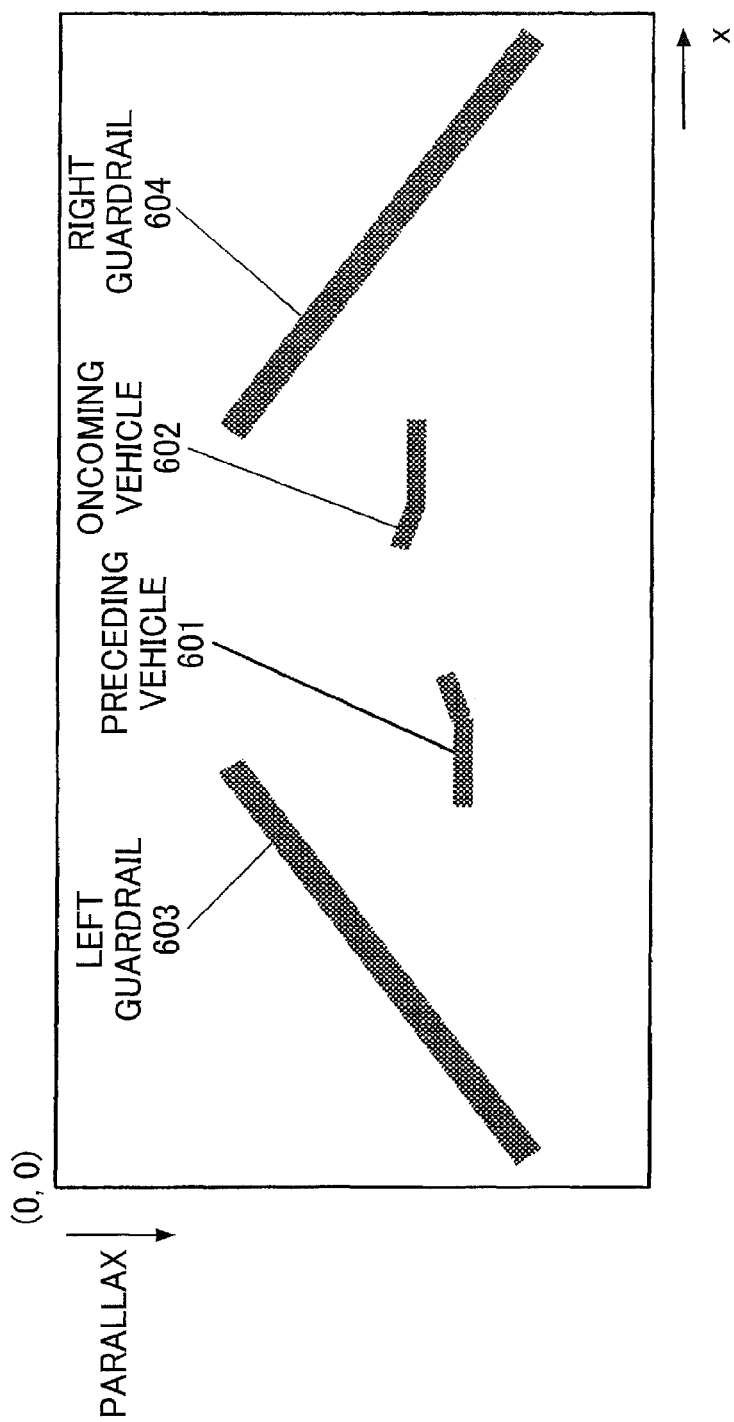

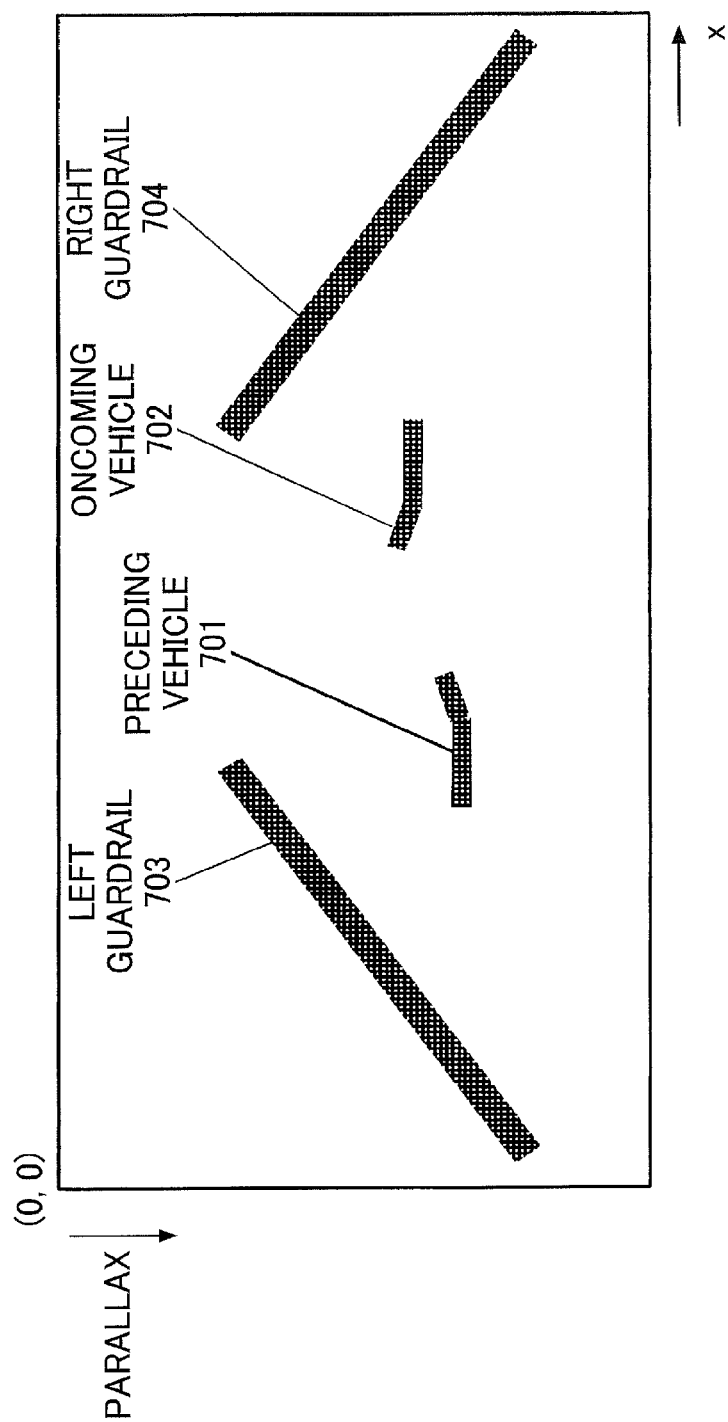

FIG.31

| OBJECT TYPE | WIDTH | HEIGHT | DEPTH | UNIT (mm) |
|---|---|---|---|---|
| MOTORCYCLE, BIKE | <1100 | <2500 | >1000 | |
| PEDESTRIAN | <1100 | <2500 | <=1000 | |
| COMPACT CAR | <1700 | <1700 | <10000 | |
| ORDINARY VEHICLE | <1700 | <2500 | <10000 | |
| TRUCK | <3500 | <3500 | <15000 | |
| OTHERS | OTHER THAN SPECIFIED ABOVE | | | |

IMAGE PROCESSING APPARATUS, IMAGING DEVICE, DEVICE CONTROL SYSTEM, FREQUENCY DISTRIBUTION IMAGE GENERATION METHOD, AND RECORDING MEDIUM

CROSS-REFERENCE TO RELATED APPLICATIONS

The present application is based upon and claims the benefit of priority of Japanese Patent Application No. 2015-212603, filed on Oct. 29, 2015, the contents of which are incorporated herein by reference in their entirety.

BACKGROUND OF THE INVENTION

1. Field of the Invention

The present disclosure relates to an image processing apparatus, an imaging device, a device control system, a frequency distribution image generation method, and a recording medium.

2. Description of the Related Art

Conventionally, the development of a body structure of an automotive vehicle was carried out for the purpose of promoting the safety and protection of vehicle occupants or pedestrians when the vehicle collides with another vehicle or an obstruction. In recent years, however, with the advance in information processing and image processing technologies, a technique for speedily detecting other people and vehicles in front of an automotive vehicle has been developed. An automotive vehicle incorporating an automatic braking system has already come on the market, which utilizes the above technique to automatically put on brakes on the vehicle before collision and autonomously prevent the vehicle from colliding with other people and vehicles.

In order to automatically put on brakes on the vehicle, performing measurement of other people and vehicles in front of the vehicle with a high level of accuracy is needed. A technique for performing measurement using images obtained from a stereo camera is practically utilized. Further, a technique for speedily performing measurement using images obtained from a stereo camera is known in the art. For example, see Japanese Patent No. 3728160.

SUMMARY OF THE INVENTION

In one embodiment, the present disclosure provides an image processing apparatus including a processor configured to acquire a parallax image having pixel values according to a parallax of an object in a plurality of captured images, extract first pixel values from a first area of the parallax image at a first rate, extract second pixel values from a second area of the parallax image at a second rate, and generate data indicating a parallax distribution of the object in the plurality of captured images based on the extracted first and second pixel values.

The object and advantages of the invention will be implemented and attained by unit of the elements and combinations particularly pointed out in the claims. It is to be understood that both the foregoing general description and the following detailed description are exemplary and explanatory and are not restrictive of the invention as claimed.

BRIEF DESCRIPTION OF THE DRAWINGS

FIG. 5 is a diagram illustrating an example of data items of an object data list.

FIG. 8 is a block diagram illustrating a functional configuration of a road surface profile detection unit.

FIG. 23A and FIG. 23B are diagrams illustrating U maps corresponding to the reference image.

FIG. 31 is a diagram illustrating an example of a table data for object type classification.

DETAILED DESCRIPTION OF THE PREFERRED EMBODIMENTS

In one aspect, the present disclosure provides a technique for increasing the measurement speed while maintaining the level of accuracy of the measurement when performing measurement of an object using images obtained from a stereo camera disposed in a vehicle.

In the following, a moving object device control system including an image processing apparatus according to an embodiment will be described with reference to the accompanying drawings.

Figure 1:
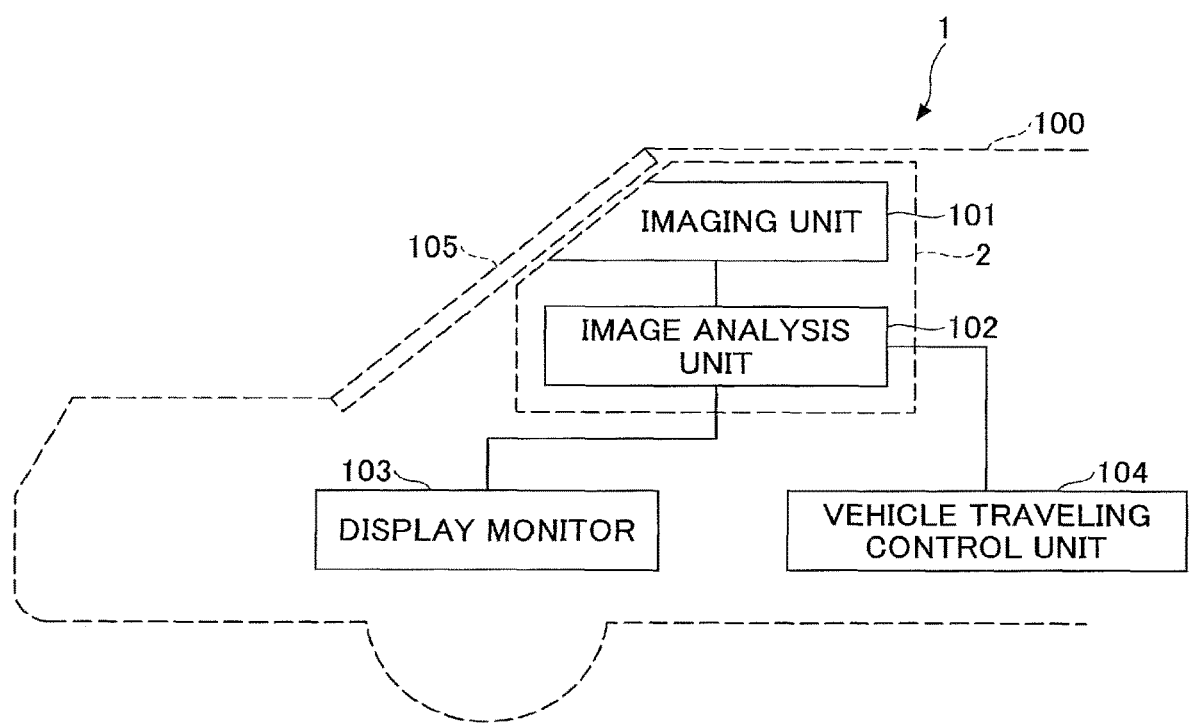
FIG. 1 is a diagram illustrating a configuration of an in-vehicle device control system which is a moving object device control system according to an embodiment.

FIG. 1 illustrates a configuration of an in-vehicle device control system 1 which is an example of the moving object device control system according to the embodiment.

The in-vehicle device control system 1 is mounted on an automotive vehicle 100. In the following, the vehicle 100 may also be referred to as a moving object. As illustrated in FIG. 1, the in-vehicle device control system 1 includes an imaging unit 101, an image analysis unit 102, a display monitor 103, and a vehicle traveling control unit 104.

The imaging unit 101 detects relative height information (indicating a relative inclination condition) of a traveling road surface (moving surface) in front of the vehicle 100 based on captured image data obtained by capturing an image of a forward area (imaging area) of the vehicle 100 in a vehicle traveling direction, detects a 3-D (three-dimensional) profile of the traveling road surface in front of the vehicle 100 based on the detected relative height information, and performs control of the vehicle 100 (the moving object) or another in-vehicle device by utilizing the detected 3-D profile. The control of the moving object may include sending a notification of warning, controlling a steering wheel of the vehicle 100 (the moving object), and controlling brakes on the vehicle 100 (the moving object).

The imaging unit 101 may be disposed in a vicinity of a room mirror (not illustrated) of a windshield 105 of the vehicle 100. Various data including the captured image data obtained by capturing images by the imaging unit 101 is input to the image analysis unit 102. The image analysis unit 102 serves as an image processing unit. The image analysis unit 102 analyzes the data received from the imaging unit 101, detects a relative height (position information) of each of respective points on the traveling road surface in front of the vehicle 100 to the road surface portion (located directly below the vehicle 100) on which the vehicle 100 is running, and recognizes the 3-D (three-dimensional) profile of the traveling road surface in front of the vehicle 100.

The result of the analysis output from the image analysis unit 102 is transmitted to each of the display monitor 103 and the vehicle traveling control unit 104. The captured image data obtained by the imaging unit 101 and the result of the analysis output from the image analysis unit 102 are displayed on the display monitor 103. The vehicle traveling control unit 104 recognizes objects, such as preceding vehicles, and pedestrians or obstacles in front of the vehicle 100, based on the recognition result of the relative inclination condition of the traveling road surface received from the image analysis unit 102, and performs traveling support control of the vehicle 100 based on the result of the recognition of the objects, such as sending a notification of warning to the driver of the vehicle 100, controlling the steering wheel of the vehicle 100, and controlling the brakes on the vehicle 100.

Figure 2:
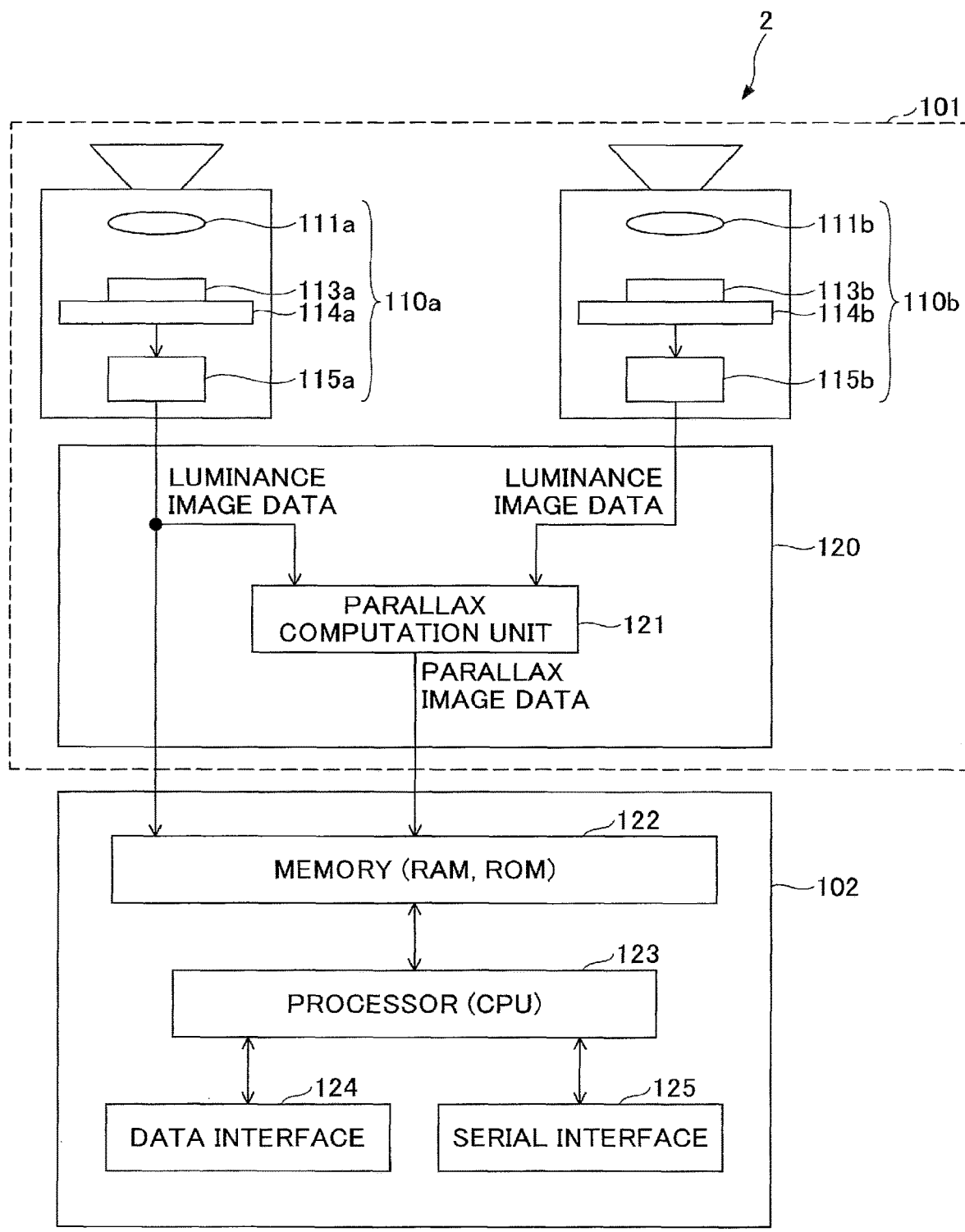
FIG. 2 is a diagram illustrating a configuration of an imaging unit and an image analysis unit.

FIG. 2 illustrates a configuration of the imaging unit 101 and the image analysis unit 102.

As illustrated in FIG. 2, the imaging unit 101 includes a stereo camera having a pair of imaging portions 110a and 110b (each of which is an image capturing unit). The imaging portion 110a includes an imaging lens 111a, an image sensor 113a in which photodetectors are arrayed in a two-dimensional formation, a sensor board 114a on which the image sensor 113a is mounted, and a signal processor 115a. The signal processor 115a converts an analog signal from the sensor board 114a (which signal is an electric signal indicating the light receiving amount of the photodetectors on the image sensor 113a) into a digital signal, and generates the captured image data from the digital signal. The elements 111b, 113b, 114b, 115b of the imaging portion 110b are essentially the same as the elements 111a, 113a, 114a, 115a of the imaging portion 110a described above, and a description thereof will be omitted. The imaging unit 101 is configured to output luminance image data and parallax image data.

The imaging unit 101 further includes a processing hardware unit 120 which is implemented by a field-programmable gate array (FPGA) or the like. The processing hardware unit 120 includes a parallax computation unit 121 which is a parallax image information generation unit configured to compute a parallax value of a correspondence image portion between the captured images obtained by the imaging units 110a and 110b, in order to obtain a parallax image from the luminance image data output from the imaging units 110a and 110b.

Here, one of the captured images obtained by the imaging units 110a and 110b is regarded as a reference image and the other captured image is regarded as a comparison image. An amount of deviation of an image portion in the comparison image from an image portion in the reference image, both the image portions corresponding to a same point in the imaging area, is computed as the parallax value of the correspondence image portion. By utilizing the principle of triangulation, a distance to the same point in the imaging area corresponding to the image portion may be computed based on the parallax value of the correspondence image portion.

Figure 3:
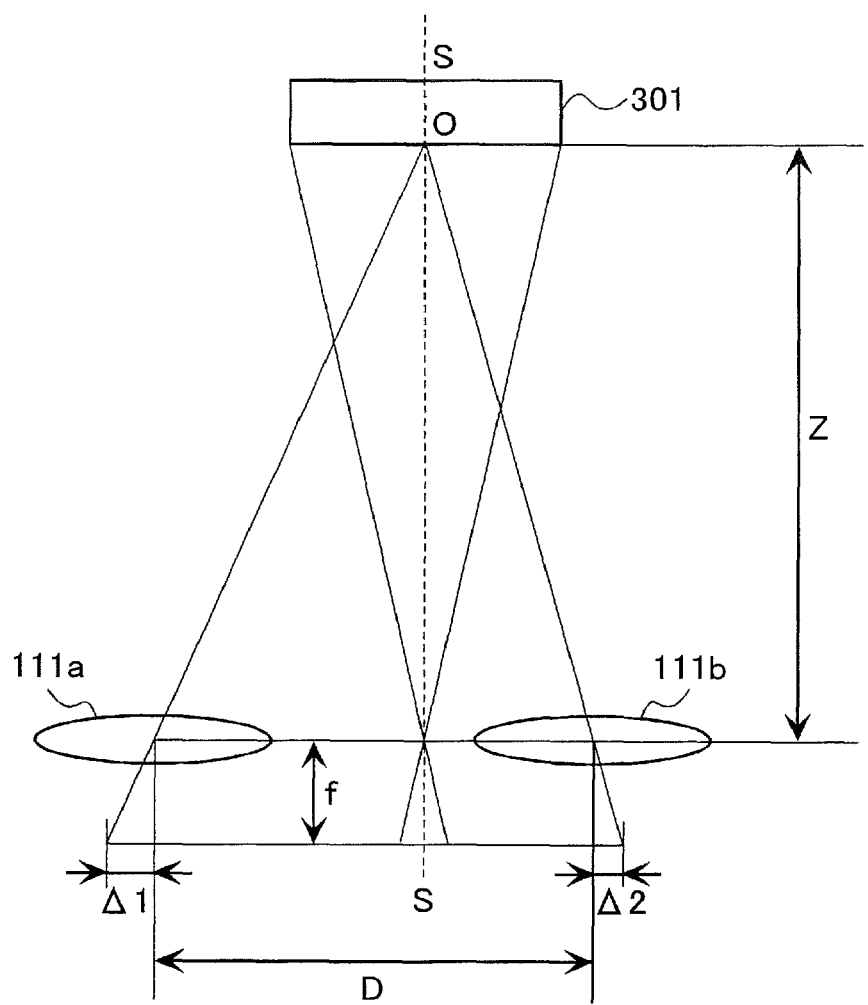
FIG. 3 is a diagram for explaining a method of computing a distance from a parallax value by utilizing the principle of triangulation.

FIG. 3 is a diagram for explaining a method of computing a distance from a parallax value by utilizing the principle of triangulation. In FIG. 3, "f" denotes a focal distance of each of the imaging lenses 111a and 111b, "D" denotes a distance between the optical axes of the imaging lenses 111a and 111b, and "Z" denotes a distance from the imaging lenses 111a and 111b to a subject 301 in a direction parallel to the direction of the optical axes. As illustrated in FIG. 3, a distance of an image formation position of a left image with respect to a point O on the subject 301 from an image formation center thereof is set to Δ1, and a distance of an image formation position of a right image with respect to the point O on the subject 301 from an image formation center thereof is sent to Δ2. The parallax value d in this example is represented by the formula: d=Δ1+Δ2.

Referring back to FIG. 2, the image analysis unit 102 includes a memory unit 122 which stores the luminance image data and the parallax image data output from the imaging unit 101. The memory unit 122 is formed on an image processing board and implemented by a read-only memory (ROM) and a random access memory (RAM). The image analysis unit 102 further includes a processor 123, a data interface 124, and a serial interface 125. The processor 123 is implemented by a central processing unit (CPU) which is configured to execute a computer program stored in the memory unit 122 for performing an object recognition process and a parallax computation control.

The FPGA which implements the processing hardware unit 120 is configured to perform processes which require real-time processing of image data, such as gamma correction and distortion correction (collimation of left and right captured images), and configured to perform parallax computation by block matching, so that parallax image information is generated and the parallax image information is stored in the RAM of the image analysis unit 102. The processor (CPU) 123 of the image analysis unit 102 is configured to control overall operations of the image sensor controllers of the imaging units 110a and 110b and overall operations of the image processing board. Further, the processor (CPU) 123 of the image analysis unit 102 is configured to perform various processes based on the computer programs read from the ROM, including a 3-D profile detection process related to a road surface and an object detection process related to a guardrail or the like (target object), by receiving the luminance image data and the parallax image data from the RAM as the input data, and configured to output the results of the processes to an external device via the data interface 124 or the serial interface 125. The processor (CPU) 123 of the image analysis unit 102 may be configured to receive, when the above processes are performed, vehicle performance information, including a steering angle, a yaw rate, an acceleration (mainly a forward/backward acceleration), and a vehicle speed of the vehicle 100, by means of the data interface 124, and use the vehicle performance information as a parameter of the above processes. The data output to the external device is used by the external device as input data for controlling the in-vehicle devices of the vehicle 100 (brake control, speed control, warning control).

Note that the imaging unit 101 and the image analysis unit 102 may be configured as a single imaging device 2.

[Object Detection Process]

Figure 4:
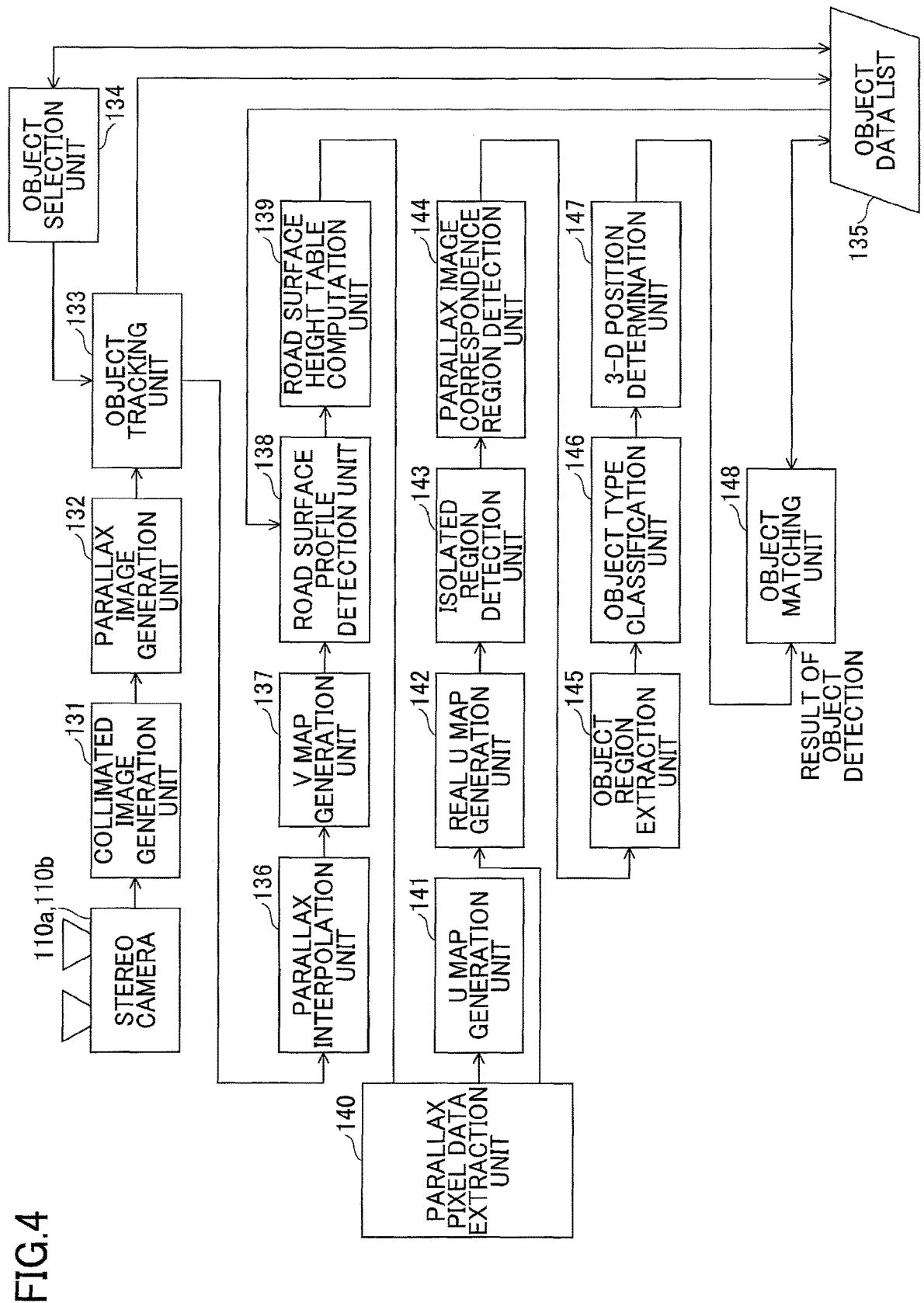
FIG. 4 is a block diagram illustrating a functional configuration of a processing hardware unit and the image analysis unit to perform an object detection process.

FIG. 4 illustrates a functional configuration of the processing hardware unit 120 and the image analysis unit 102 in FIG. 2 for performing an object detection process. In the following, the object detection process according to this embodiment will be described. Various units 131 to 148 illustrated in FIG. 4 represent functions and units implemented by any of the elements and devices of the processing hardware unit 120 and the image analysis unit 102 illustrated in FIG. 2, which are activated by instructions from the processor 123 based on the programs stored in the memory 122.

The imaging units 110a and 110b which constitute the stereo camera output the luminance image data. When the imaging units 110a and 110b output color luminance image data at this time, color luminance conversion is performed to convert the RGB signals of the color luminance image data into a luminance signal (Y) by using the following formula (1).

$$Y=0.3R+0.59G+0.11B \qquad (1)$$

[Collimated Image Generation Process]

A collimated image generation unit 131 which is implemented by the parallax computation unit 121 (FIG. 2) is configured to perform a collimated image generation process on the luminance image data. In the collimated image generation process, based on the relative spatial relationship between the left and right imaging units 110a and 110b and the distortion of the optical systems of the imaging units 110a and 110b, the luminance image data (the reference image and the comparison image) output from the imaging units 110a and 110b are transformed into an ideal collimated stereo image which is obtained when the two pinhole cameras are mounted to be in parallel with each other. In the collimated image generation process, an amount of distortion for each of pixels is computed by using polynomials Δx=f(x, y) and Δy=g(x, y), and each of the pixels of the luminance image data (the reference image and the comparison image) output from the imaging units 110a and 110b is transformed into a pixel of the collimated stereo image by using the computation result (the distortion amount of each of the pixels). For example, the above polynomials are determined based on the fifth polynomials with respect to x (a position in a lateral direction of the image) and y (a position in a longitudinal direction of the image).

[Parallax Image Generation Process]

After the collimated image generation process is performed, a parallax image generation unit 132 which is implemented by the parallax computation unit 121 (FIG. 2) is configured to perform a parallax image generation process, so that the parallax image data (parallax image information) is generated. In the parallax image generation process, the luminance image data of the imaging unit 110a that is one of the imaging units 110a and 110b is regarded as reference image data, and the luminance image data of the imaging unit 110b that is the other imaging unit is regarded as comparison image data. In the parallax image generation process, parallax values between the comparison image data and the reference image data are computed, and parallax image data are generated and output. The parallax image data indicate a parallax image in which a pixel value according to the parallax value d computed with respect to each of image portions of the reference image data is represented as a pixel value of the corresponding image portion.

Specifically, the parallax image generation unit 132 determines a block of several pixels (e.g., 16×1 pixels) where a pixel of interest is included as a central pixel of the block, with respect to a line of the reference image data. The parallax image generation unit 132 computes a correlation value indicating correlation between a feature amount indicating a feature of the pixel values of each block of the comparison image data and a feature amount indicating a feature of the pixel values of the block of the reference image data each time the block of the comparison image data at the same line and with the same size as the block of the reference image data is shifted in the horizontal direction (x direction) by one pixel. The parallax image generation unit 132 performs a matching process to select one of the blocks of the comparison image data whose feature value is most correlated with the feature amount of the block of the reference image data, based on the computed correlation values. Then, the parallax image generation unit 132 computes, as the parallax value d, an amount of deviation between the pixel of interest of the block of the reference image data and the corresponding pixel of the block of the comparison image data selected by the matching process. The parallax image generation unit 132 obtains the parallax image data by performing the process of computing the parallax value d repeatedly for the whole area or a particular area of the reference image data.

For example, the luminance values of the pixels included in the block may be used as the feature amount of the block for the matching process, and a sum of the absolute values of differences between the luminance values of the pixels of the block of the reference image data and the luminance values of the corresponding pixels of the block of the comparison image data may be used as the correlation value. In this case, the block with the smallest sum of the absolute values of the differences is determined as the most correlated one.

When the matching process by the parallax image generation unit 132 is performed by hardware processing, any one of the known techniques, including SSD (Sum of Squared Difference), ZSSD (Zero-mean Sum of Squared Difference), SAD (Sum of Absolute Difference), and ZSAD (Zero-mean Sum of Absolute Difference), may be utilized. Note that only the parallax value per pixel may be computed by the matching process, and if a sub pixel level parallax value (which is less than one pixel level parallax value) is required, it is necessary to use an estimated parallax value. As a process for estimating a sub pixel level parallax value, an isometric straight line fitting process or a quadratic curve fitting process may be utilized. However, an error arises in the estimated parallax value, and an EEC (estimated error correction) process may be performed in order to reduce the error in the estimated parallax value.

[Object Tracking]

Subsequently, an object tracking unit 133 is configured to perform an object tracking process which tracks an object (detection target) detected by the image detection process of the previously captured frames.

In this embodiment, an object data list 135 which indicates information related to the objects previously detected by the image detection process is stored. As illustrated in FIG. 5, the object data list 135 includes object data (which includes the latest position, a size, a distance, a relative velocity, a maximum parallax, and a minimum parallax of the object), object prediction data (which indicates a predicted position of the object in the following captured frame), object feature amounts (which are used by the object tracking unit 133 and an object matching unit 148), detected/undetected frame numbers (which indicates the number of frames in which the object has been detected, and the number of frames in which the object has not been detected continuously), and a probability (a stability flag (S) indicating whether the object is a tracking target).

An object selection unit 134 is configured to make reference to the object of interest stored in the object data list 135, and determine whether the object is to be selected as the tracking target by detecting the probability of the object as being high (S=1) and detecting the position of the object as being suitable for the tracking target. Specifically, a prediction range in the parallax image data where the presence of the object is predicted is set up based on the object prediction data of the object data list 135, a height of the object found in the prediction range is determined, a width of the object is determined from the height of the object based on the object feature amount of the object data list 135, and a lateral direction position of the object in the parallax image data is estimated from the width of the object. When the estimated lateral direction position of the object satisfies a predetermined tracking target requirement (when the probability that the object exists in the corresponding image is high, or when the position of the object is suitable for the tracking target), the object selection unit 134 determines that the object is to be selected as the tracking target, and outputs the result of the determination to the object tracking unit 133. Note that the information of the object data list 135 is updated based on the result of the determination by the object selection unit 134.

The object tracking unit 133 performs the tracking process on the object selected as the tracking target by the object selection unit 134. To perform the tracking process, the object tracking unit 133 receives the parallax image data generated by the parallax image generation unit 132, and the object prediction data and the object feature amounts of the object data related to the object selected by the object selection unit 134.

[Parallax Image Interpolation Process]

After the parallax image generation process is performed, a parallax interpolation unit 136 which is implemented by the image analysis unit 102 is configured to perform a parallax image interpolation process to generate an interpolation parallax image.

The parallax value d is a value indicating an amount of deviation in the horizontal direction, and it is difficult to compute a parallax value with respect to a horizontal edge portion of a captured image or a portion of a captured image where difficult to recognize a preceding vehicle as a single object. A parallax interpolation unit 136 is configured to perform interpolation of two points of a parallax image, when predetermined conditions are met (e.g., when a real distance between the two points of the parallax image is less than a predetermined distance and there is no different parallax value between the two points).

[V Map Generation Processing]

Subsequently, a V map generation unit 137 is configured to perform a V map generation process so that a V map is generated. Each of pixel data items included in the parallax image data is represented by a group (x, y, d) of an x-axis direction position x, a y-axis direction position y, and a parallax value d. Parallax histogram information is generated by transforming each pixel data item (x, y, d) of the parallax image data into three-dimensional coordinate information (d, y, f) where d is assigned to the x-axis, y is assigned to the y-axis, and a frequency f is assigned to the z-axis, or two-dimensional coordinate information (d, y, f) which is restricted from the three-dimensional-coordinate information (d, y, f) to the information which exceeds a predetermined frequency threshold. In this embodiment, the parallax histogram information includes the three-dimensional-coordinate information (d, y, f), and a map in which the three-dimensional histogram information is distributed in the X-Y two-dimensional coordinate system will be referred to as a V map (a parallax histogram map or a V-disparity map).

Specifically, the V map generation unit 137 is configured to compute a parallax value frequency distribution for each of line areas of the parallax image data which are obtained by dividing the image into image portions in the up/down direction. The parallax histogram information is the information indicating the parallax value frequency distribution computed by the V map generation unit 137.

Figure 6A:
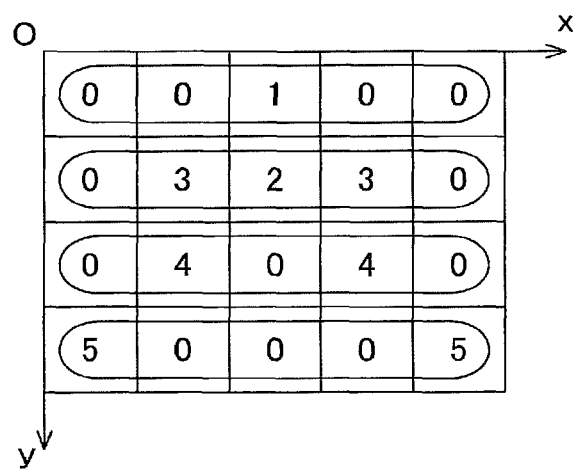
FIG. 6A and FIG. 6B are diagrams for explaining parallax image data and a V map generated from the parallax image data.
Figure 6B:
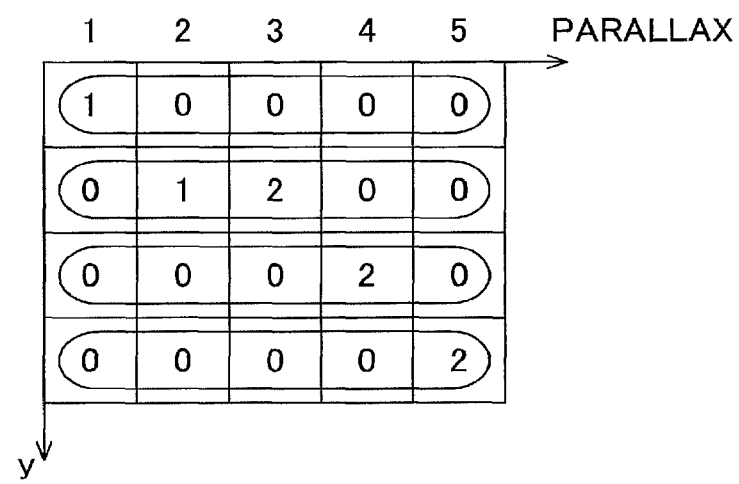

FIG. 6A and FIG. 6B are diagrams for explaining the parallax image data and the V map generated from the parallax image data. FIG. 6A illustrates an example of a parallax value distribution of a parallax image, and FIG. 6B illustrates the V map which indicates a parallax value frequency distribution for each of the lines of the parallax image illustrated in FIG. 6A.

When the parallax image data having the parallax value distribution as illustrated in FIG. 6A is received, the V map generation unit 137 computes a parallax value frequency distribution which indicates a distribution of the number of data items of the parallax value for each of the lines, and outputs this parallax value frequency distribution as the parallax histogram information. The information of the parallax value frequency distribution computed for each of the lines is expressed in the two-dimensional rectangular coordinate system where the position in the y-axis direction of the parallax image (or the position in the up/down direction of the captured image) is assigned to the y-axis and the parallax value is assigned to the x-axis. In this way, the V map as illustrated in FIG. 6B can be obtained. This V map may also be expressed as an image in which pixels each having a pixel value according to the frequency f are distributed in the two-dimensional rectangular coordinate system.

Figure 7A:
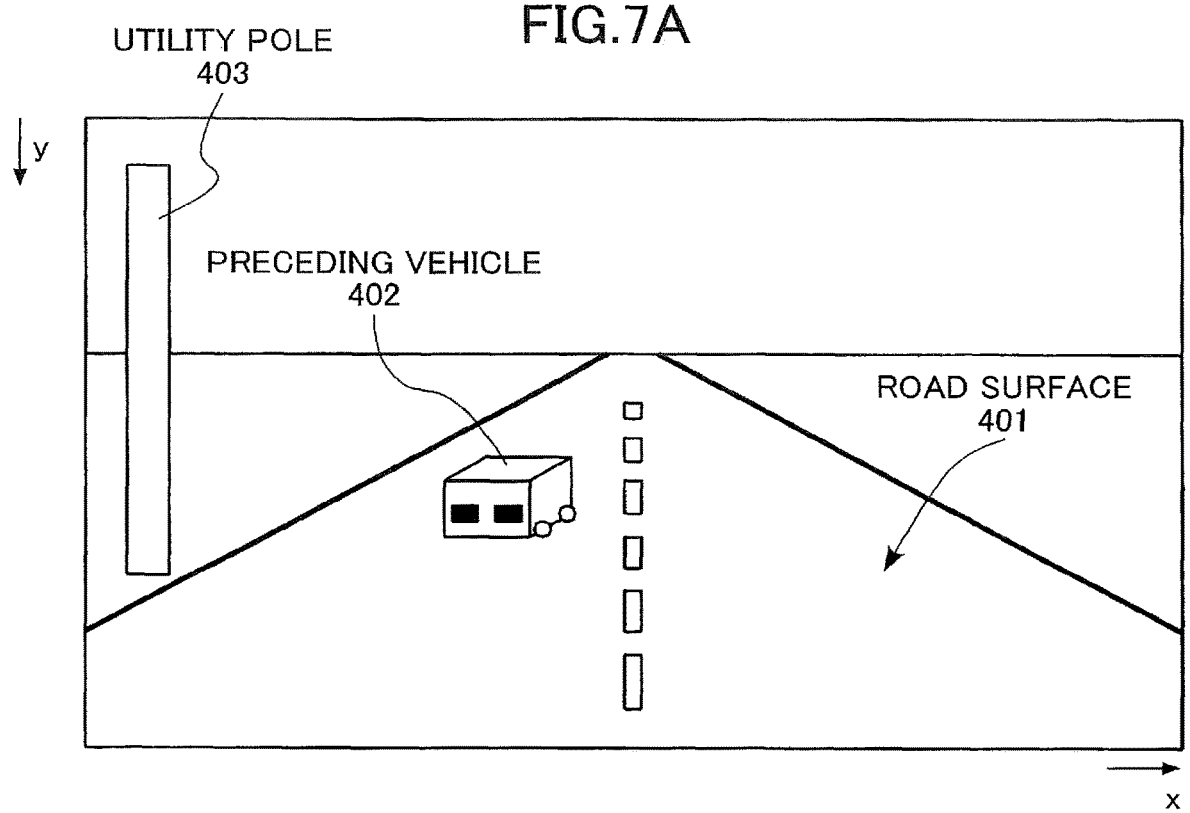
FIG. 7A is a diagram illustrating an example of a captured image obtained as a reference image by an imaging unit.
Figure 7B:
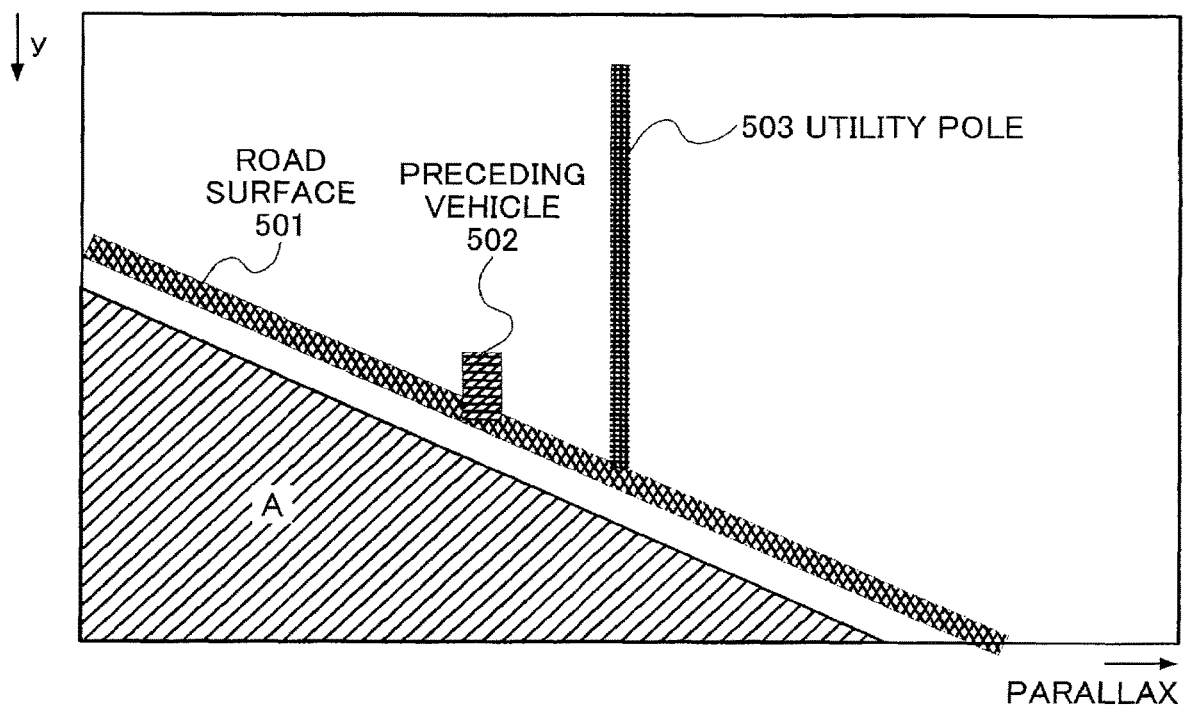
FIG. 7B is a diagram illustrating a V map corresponding to the captured image.

FIG. 7A and FIG. 7B are diagrams illustrating an example of a captured image obtained as a reference image by one of the imaging units, and a V map generated from the captured image. FIG. 7A illustrates the captured image, and FIG. 7B illustrates the V map. The V map illustrated in FIG. 7B is generated based on the captured image illustrated in FIG. 7A. The parallax is not detected from an area below a road surface 501, and, in the shaded area A of the V map indicated in FIG. 7B, the parallax value is not counted.

In the image example of FIG. 7A, the road surface 401 on which the vehicle are running, a preceding vehicle 402 existing ahead of the vehicle, and an electric pole 403 existing outside the road surface 401 are indicated. In the V map illustrated in FIG. 7B, a road surface 501, a preceding vehicle 502, and an electric pole 503, which correspond to the elements of the image example, are indicated.

The image example is obtained in a case where the road surface in front of the vehicle is a flat road surface (i.e., the road surface in front of the vehicle is consistent with a virtual reference road surface (virtual reference moving surface) obtained by extending in the vehicle forward direction a road surface parallel to a road surface portion directly below the vehicle). In this case, the points with a high frequency in the lower portion of the V map corresponding to the lower portion of the image are distributed along an approximately straight line having an inclination to decrease the parallax value d toward the upper portion of the image. It can be understood that the pixels indicating the above distribution are obtained when an image of a target object existing substantially at the same distance in each of the lines of the parallax image and having the highest occupancy with the distance continuously increasing toward the upper portion of the image is captured.

The imaging unit 110*a* captures an image in the front area of the vehicle, and the content of the captured image indicates that the parallax value d of the road surface decreases toward the upper portion of the image, as illustrated in FIG. 7A. Moreover, the pixels indicating the road surface have the same parallax value d in the same line (horizontal line). Hence, the points with a high frequency being distributed along the approximately straight line in the V map correspond to the feature of the pixels indicating the road surface (the moving surface). Thus, the pixels of the points distributed on an approximate line obtained by performing linear approximation of the points with a high frequency of the V map or existing in the vicinity of the approximate line can be estimated with a high level of accuracy as the pixels indicating the road surface. Further, the distance to the road surface portion indicated by the pixels can be determined with a high level of accuracy based on the parallax value d of the corresponding point on the approximate line.

[Road Surface Profile Detection]

Next, a process performed by a road surface profile detection unit 138 will be described. After the V map information is generated by the V map generation unit 137, the road surface profile detection unit 138 is configured to perform linear approximation of the points with a high frequency of the V map which have the feature indicated by the group of the parallax value and the y-axis direction position (the V map elements) corresponding to the road surface (i.e., the feature that the parallax value decreases toward the upper portion of the captured image). When the road surface is a flat surface, an approximate line can be obtained by the linear approximation with good accuracy. However, when the road surface has an inclination that is varied in the vehicle traveling direction, it is difficult to obtain an approximate line by the linear approximation with good accuracy. Hence, in this embodiment, the V map information is divided into two or more parallax value sections according to the parallax value, and the linear approximation is performed for each of the parallax value sections.

FIG. 8 is a block diagram illustrating a functional configuration of the road surface profile detection unit 138. As illustrated in FIG. 8, the road surface profile detection unit 138 in this embodiment includes a road surface candidate point detection unit 138*a*. After the V map information is received from the V map generation unit 137, the road surface candidate point detection unit 138*a* is configured to detect the points with a high frequency of the V map having the feature indicated by the V map elements corresponding to the road surface (i.e., the feature that the parallax value decreases toward the upper portion of the captured image) as road surface candidate points.

In the road surface candidate point detection process performed by the road surface candidate point detection unit 138*a*, the V map information is divided into two or more parallax value sections according to the parallax value, and the road surface candidate points are determined for each of the parallax value sections according to a determination algorithm provided for each of the parallax value sections. Specifically, the V map information is divided at the parallax value corresponding to a predetermined reference distance into two sections in the x-axis direction (the lateral direction), that is, a first section with a great parallax value and a second section with a small parallax value, and the road surface candidate points are detected by using different road surface candidate point detection algorithms for the first and second sections. Namely, a first road surface candidate point detection process (described later) is performed for the first section with a great parallax value (short distance area), and a second road surface candidate point detection process (described later) is performed for the second section with a small parallax value (long distance area).

In this embodiment, the level of accuracy of the road surface detection for the different areas is maintained by dividing the V map into the short distance area and the long distance area, and detecting the road surface candidate points by using an appropriate one of the different detection methods for a corresponding one of the different areas.

Figure 9:
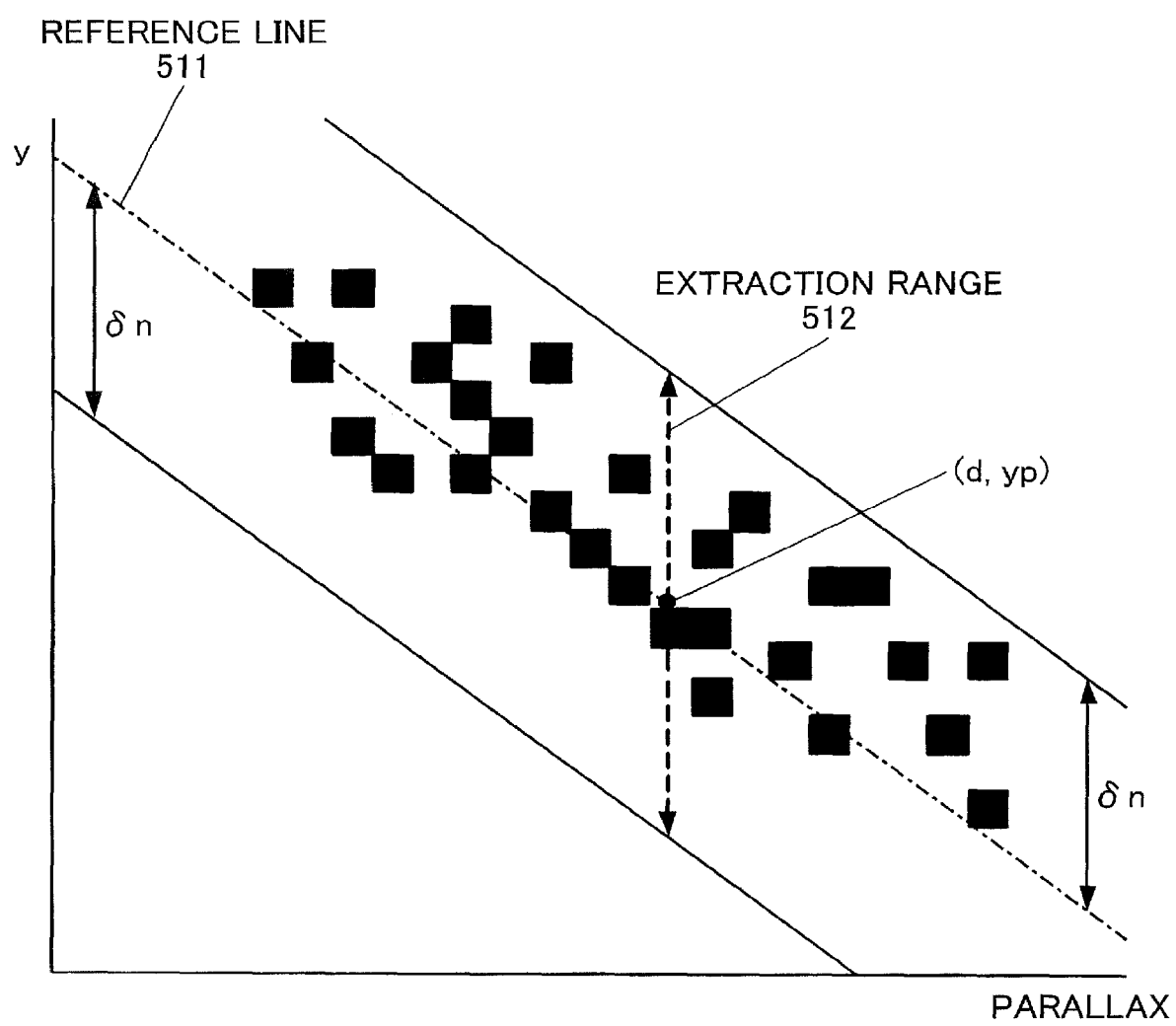
FIG. 9 is a diagram for explaining a detection method of a first road surface candidate point detection process and a second road surface candidate point detection process.

FIG. 9 is a diagram for explaining a detection method of a first road surface candidate point detection process and a second road surface candidate point detection process.

In the first road surface candidate point detection process, the y-axis direction position is changed in a predetermined search range with respect to each parallax value d, and a V map element among the V map elements (d, y, f) included in the V map information which has a frequency value f greater than a first frequency threshold and equal to the maximum frequency value f is searched for, and the V map element is determined as a road surface candidate point for the corresponding parallax value d. It is desirable that the first frequency threshold at this time is set to a comparatively small value in order to prevent the V map element corresponding to the road surface from being undetected. In this embodiment, the V map element corresponding to the road surface is extracted by the V map generation unit 137 as described above. Even if the first frequency threshold is set to the comparatively small value, the situation where a V map element which does not correspond to the road surface is determined as the road surface candidate point may be reduced.

The search range in which the y value is changed for each parallax value d is the extraction range 512 used by the V map generation unit 137, i.e., the range of ±δ in the image up/down direction when the image up/down direction position yp on the reference line 511 is centered. Specifically, the range 512 between (yp−δn) through (yp+δn) is set to the search range. Thereby, the range of the y value to be searched is limited, and the road surface candidate point detection process may be performed speedily.

On the other hand, the second road surface candidate point detection process is the same as the above-described first road surface candidate point detection process except for using a second frequency threshold different from the first frequency threshold. Namely, in the second road surface candidate point detection process, the y-axis direction position is changed in the predetermined search range with respect to each parallax value d, and a V map element among the V map elements (d, y, f) included in the V map information which has a frequency value f greater than the second frequency threshold and equal to the maximum frequency value f is searched for, and the V map element is determined as a road surface candidate point for the corresponding parallax value d.

Figure 10:
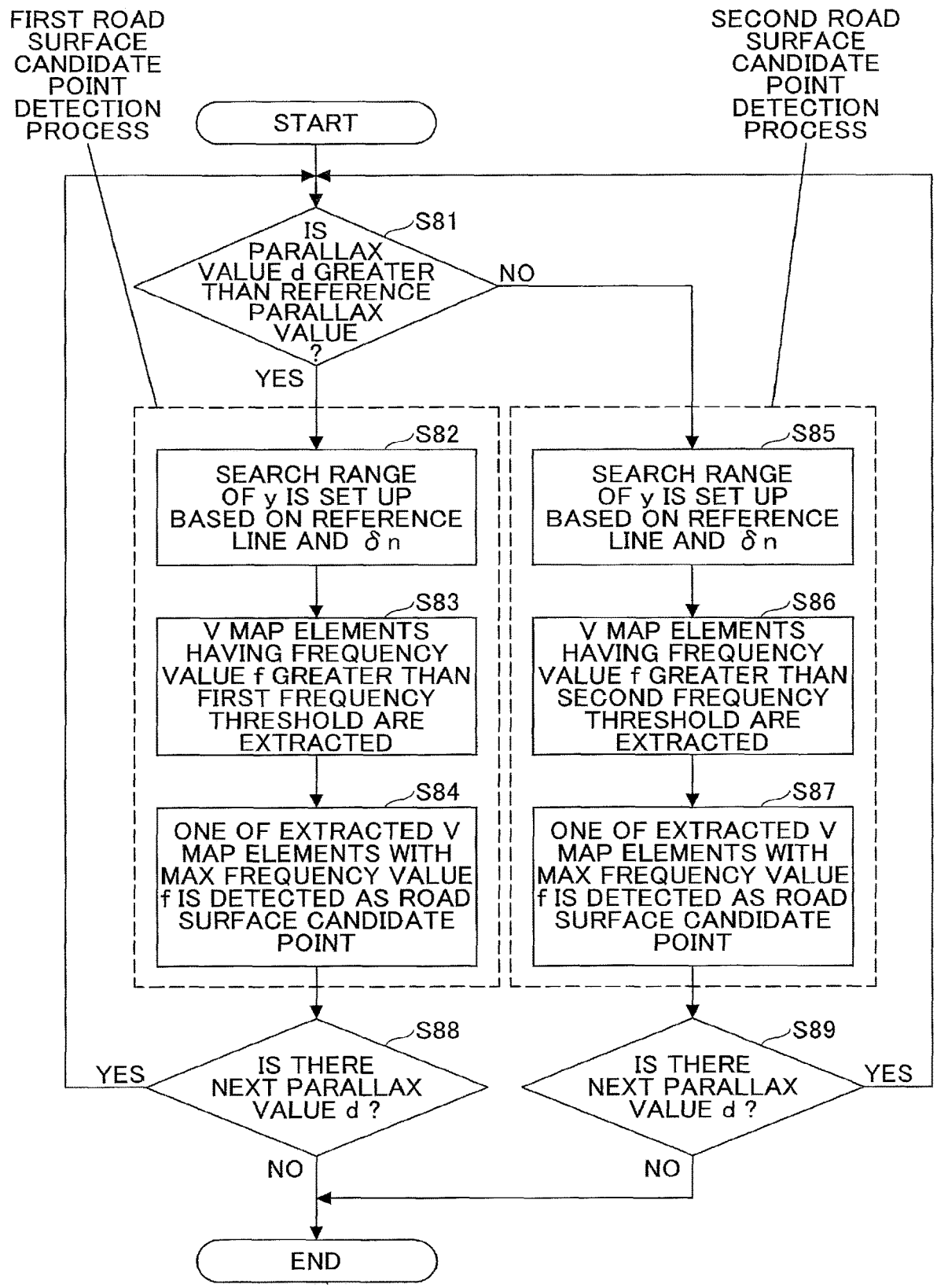
FIG. 10 is a flowchart for explaining a road surface candidate point detection process performed by a road surface candidate point detection unit.

FIG. 10 is a flowchart for explaining a road surface candidate point detection process performed by the road surface candidate point detection unit 138a.

For example, a road surface candidate point in the received V map information is detected in descending order of the parallax value d, and the road surface candidate point (y, d) for each parallax value d is detected. When the parallax value d is greater than a reference parallax value corresponding to a predetermined reference distance (step S81: YES), the above-described first road surface candidate point detection processing is performed. Namely, the search range of y (the range between (yp−δn) and (yp+δn)) according to the applicable parallax value d is set up (step S82), and a V map element (d, y, f) included in the search range and having a frequency value f greater than the first frequency threshold is extracted (step S83). Then, the V map element (d, y, f) having the greatest frequency value f among the extracted V map elements is detected as the road surface candidate point for the applicable parallax value d (step S84). When there is a next parallax value d (step S88: YES), the control is returned to the processing of step S81.

The first road surface candidate point detection process is repeatedly performed until the parallax value d is less than the reference parallax value. When the parallax value d is less than the reference parallax value (step S81: NO), the above-described second road surface candidate point detection process is performed instead of the first road surface candidate point detection process. Namely, the search range of y (the range between (yp−δn) and (yp+δn)) according to the applicable parallax value d with respect to the second road surface candidate point detection process is set up (step S85), and a V map element (d, y, f) included in the search range and having a frequency value f than the second frequency threshold is extracted (step S86). Then, the V map element (d, y, f) having the greatest frequency value f among the extracted V map elements is detected as a road surface candidate point for the applicable parallax value d (step S87). When there is a next parallax value d (step S89: YES), the control is returned to the processing of step S81. The second road surface candidate point detection process is repeatedly performed until no next parallax value d is found (step S89: NO).

In this way, the road surface candidate point detection unit 138a detects the road surface candidate point for each parallax value d (extraction processing object). Next, the division linear approximation unit 138b performs a linear approximation process to determine an approximate line of the V map with respect to the detected road surface candidate points. When the road surface is a flat surface, the approximation over the whole parallax value range of the V map can be made by a single straight line with good accuracy. However, when the inclination condition of the road surface changes in the vehicle traveling direction, it is difficult to make the approximation by a single straight line with good accuracy. Hence, in this embodiment, the V map information is divided into two or more parallax value sections according to the parallax value, and the linear approximation process is performed for each of the parallax value sections.

Figure 11:
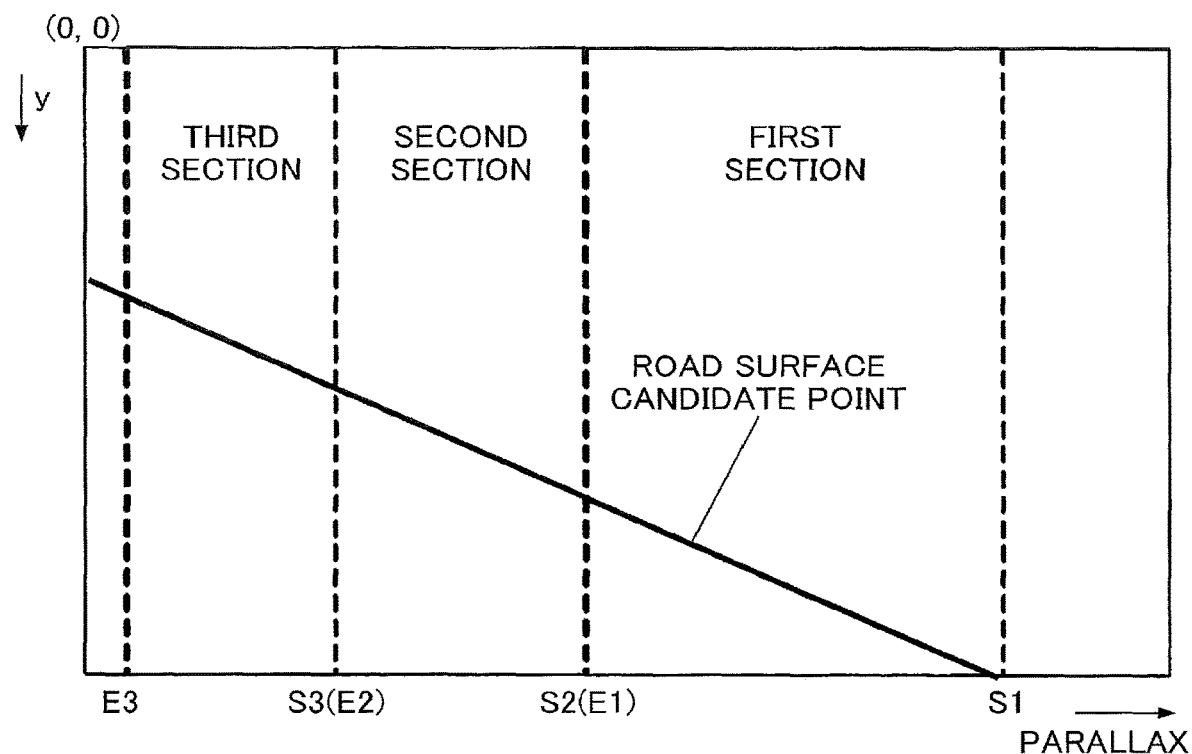
FIG. 11 is a diagram illustrating an example in which a V map is divided into three sections (parallax value sections).

FIG. 11 is a diagram illustrating an example in which a V map is divided into three sections (parallax value sections). In this embodiment, the V map information is divided into three parallax value sections according to the parallax value. Specifically, the V map information is divided into a first section, a second section, and a third section in descending order of the parallax value. If these sections are provided equally on the basis of the distance, a long-distance section of the V map has a small parallax value range which may lower the accuracy of the linear approximation. If these sections are provided equally on the basis of the parallax value, a short-distance section of the V map has a very small width. In this case, the first section has a very small width which may make the linear approximation invalid.

In this embodiment, a division rule of setting up the sections is used. According to the division rule, the first section is set up to have a predetermined width corresponding to a fixed distance, and each of the second and third sections is set up such that the section has a width corresponding to a distance of a fixed multiple (for example, twice) of a distance corresponding to a width of the preceding section. By using the division rule, each of the three sections can have a moderate width (parallax value range). Namely, according to the division rule, the corresponding distance ranges of the sections are different, and the number of the road surface candidate points used for the linear approximation process of each section is made uniform for each section, so that the linear approximation process of each section can be performed suitably.

Figure 12:
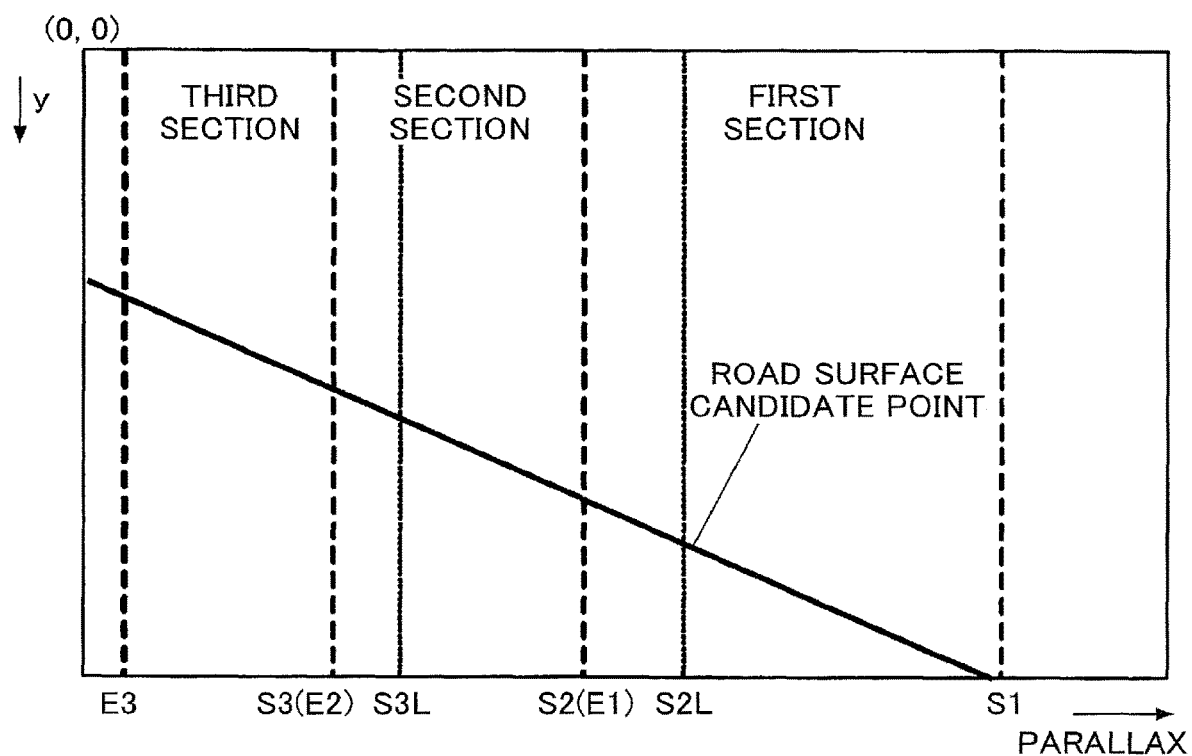
FIG. 12 is a diagram illustrating another example in which a V map is divided into three sections (parallax value sections).

In the example of FIG. 11, the V map information is divided into the three sections without overlapping. Alternatively, the V map information may be divided such that the sections overlap each other. For example, as illustrated in FIG. 12, a starting point S2L of the second section is set to a 3:1 internal division point of the first section (an end point E2 of the second section is the same as in the example of FIG. 11), a starting point S3L of the third section is set to a 3:1 internal division point between an end point E1 of the first section and the end point E2 of the second section (an end point E3 of the third section is the same as in the example of FIG. 11).

By changing the distance range according to the section, or making the sections overlap, the number of candidate points used for the linear approximation process of each section can be made uniform, and the level of accuracy of the linear approximation process of each section can be increased. Moreover, by making the sections overlap, the correlation of the linear approximation process of each section can be increased.

Figure 13A:
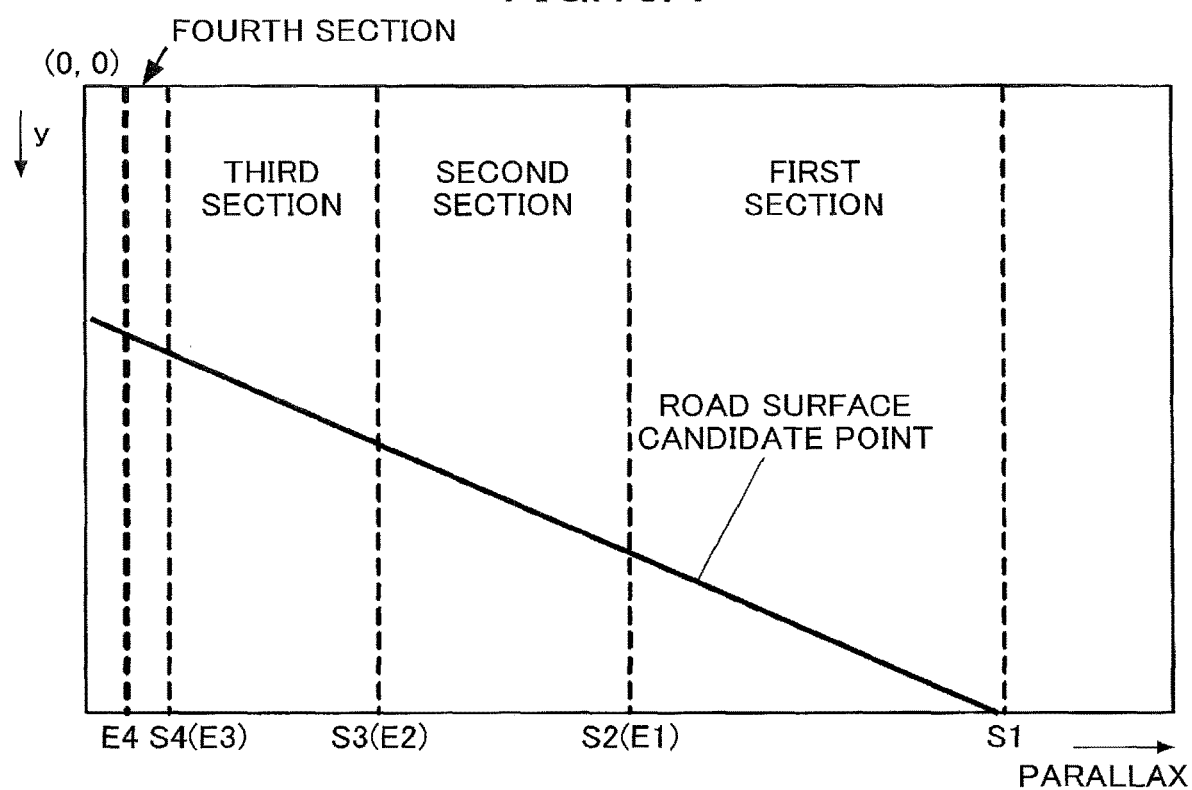
FIG. 13A is a diagram illustrating an example in which in which a fourth section is set up with a width less than an original section width (parallax value range).
Figure 13B:
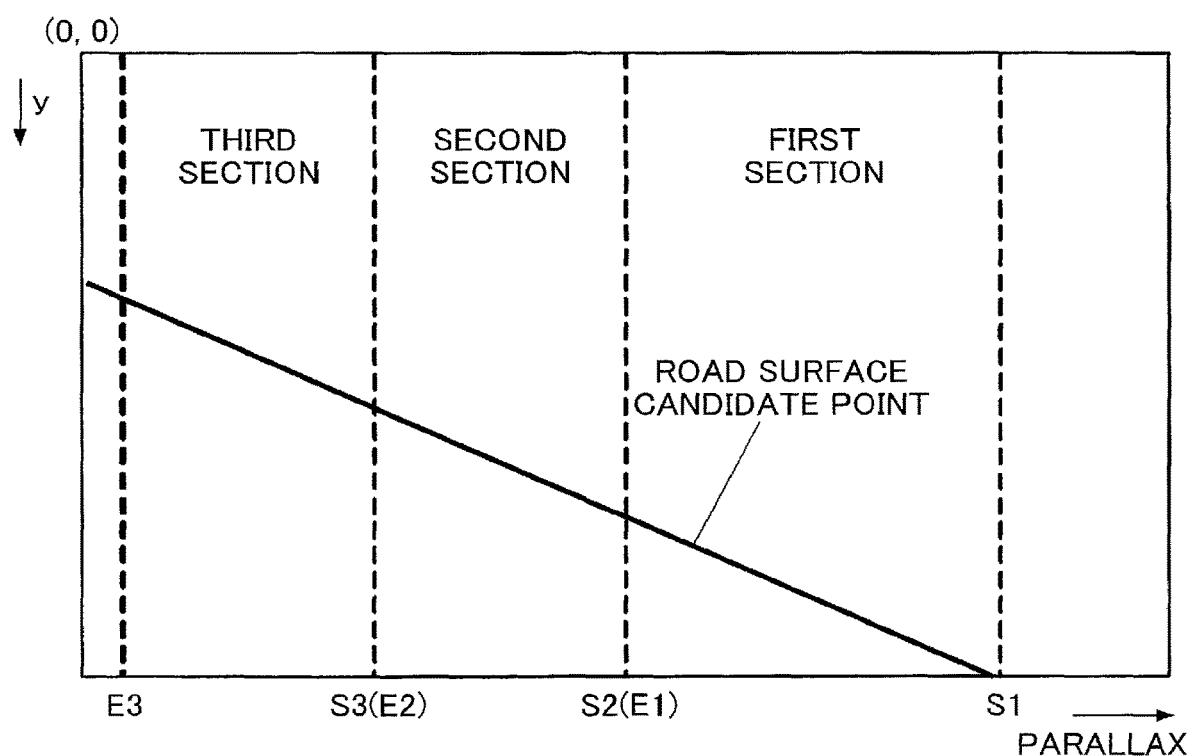
FIG. 13B is a diagram illustrating an example in which the fourth section and a third section preceding the fourth section are combined into a single section.

When the sections are set up in descending order of the parallax value according to the division rule, an undesired case may arise. As illustrated in FIG. 13A, the fourth section is set up to have a width less than its original section width (parallax value range). In this case, as illustrated in FIG. 13B, the fourth section may be combined with the third section adjacent to the fourth section into a single combined section (the third section).

Figure 14:
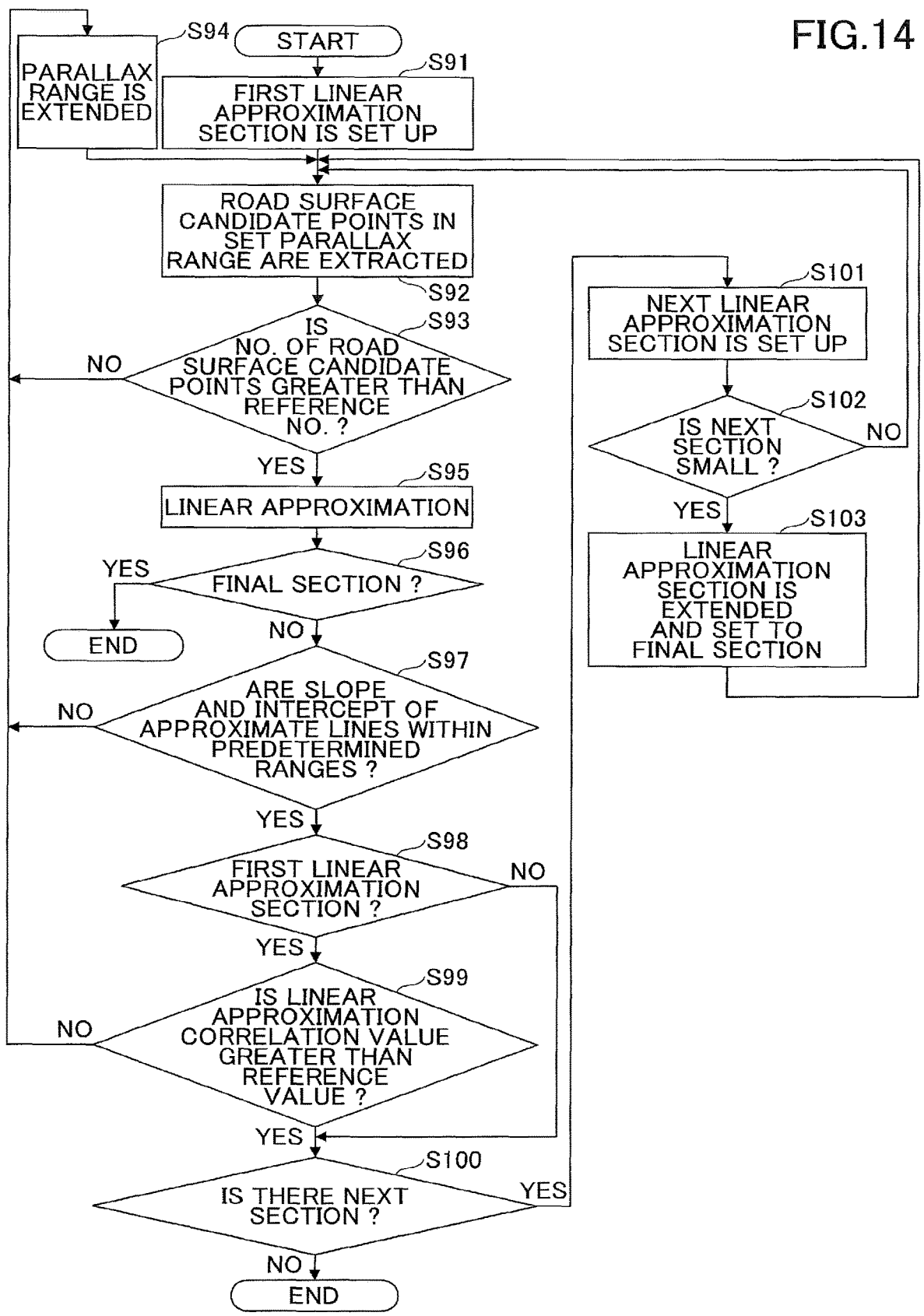
FIG. 14 is a flowchart for explaining a division linear approximation process performed by a division linear approximation unit.
Figure 15A:
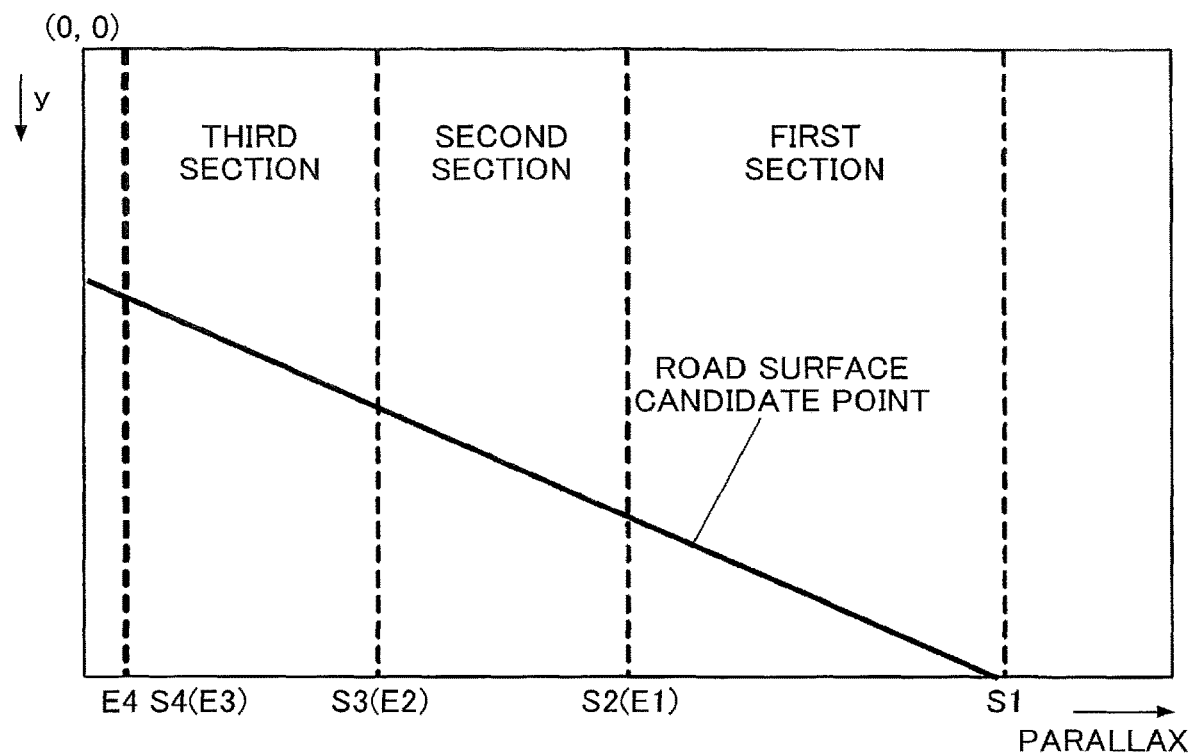
FIG. 15A and FIG. 15B are diagrams illustrating original sections and sections after the original first section is extended.
Figure 15B:
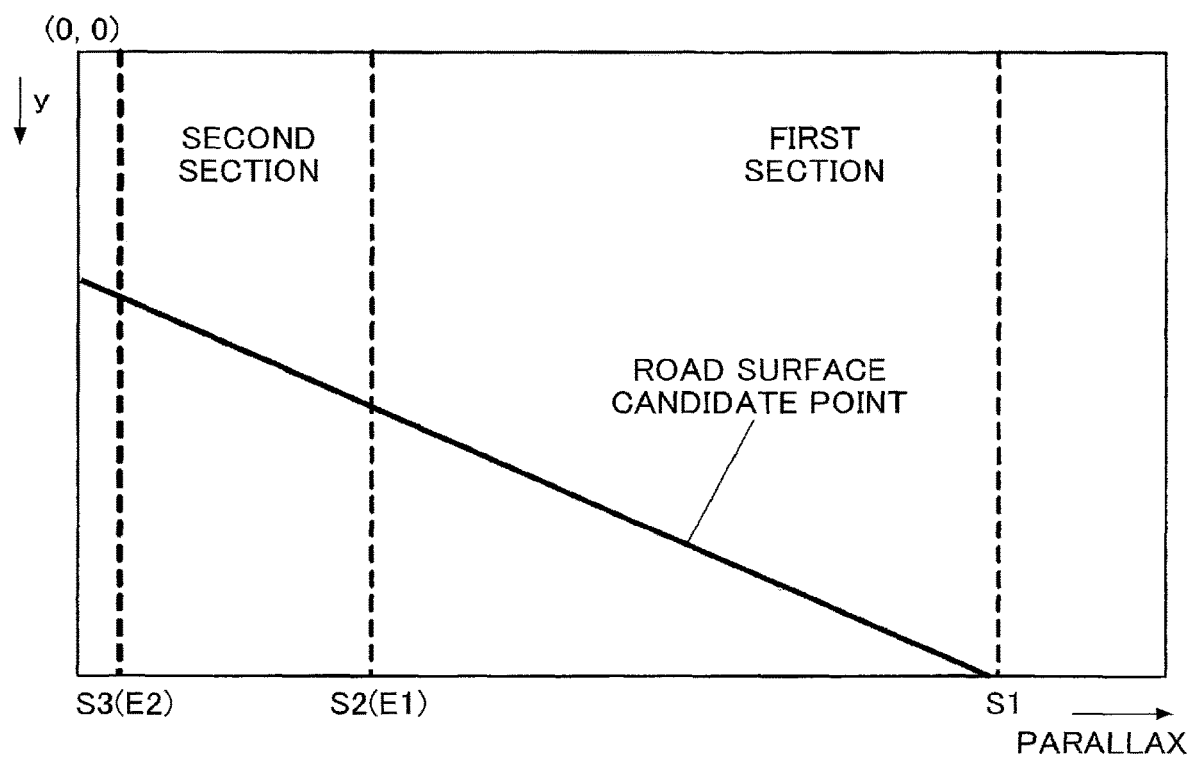
Figure 16A:
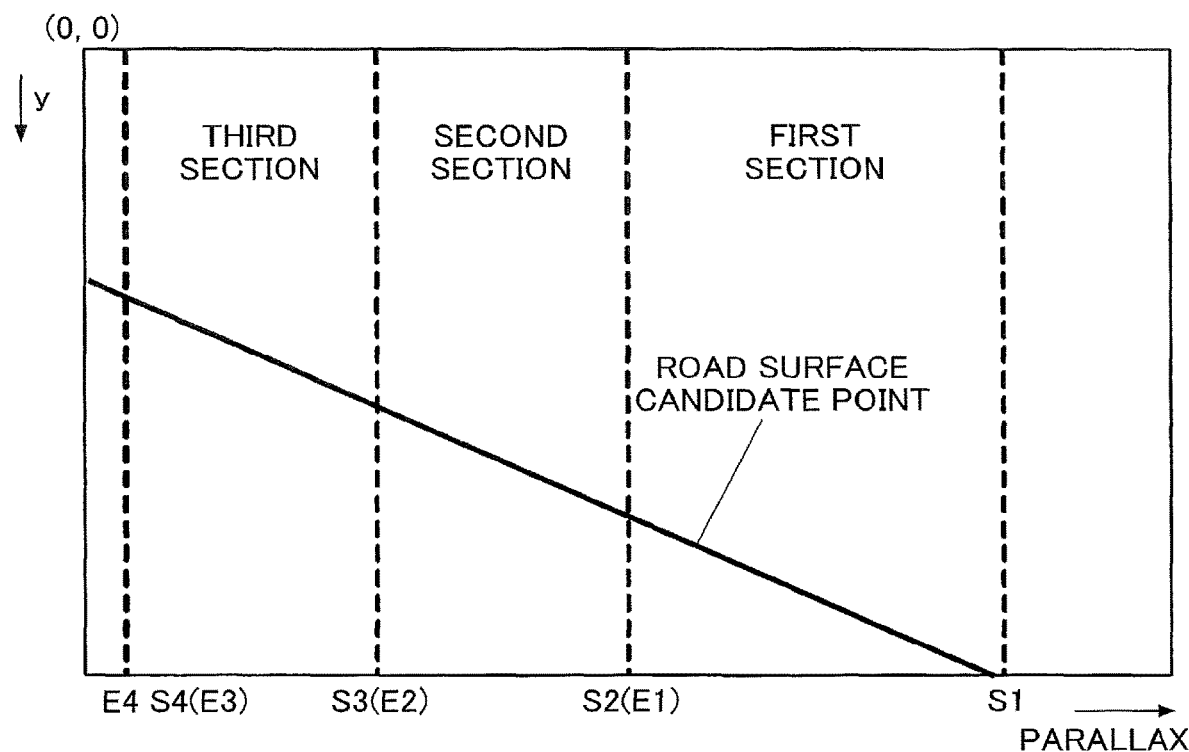
FIG. 16A and FIG. 16B are diagrams illustrating original sections and sections after the original second section is extended.
Figure 16B:
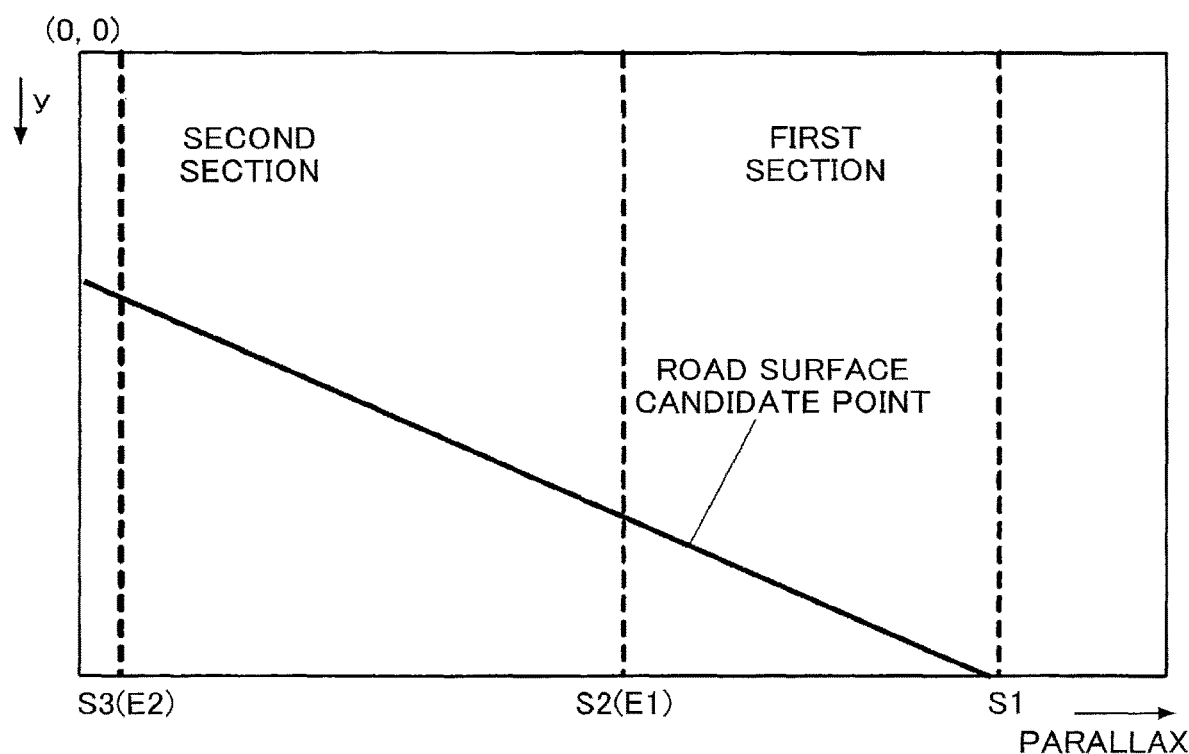
Figure 17A:
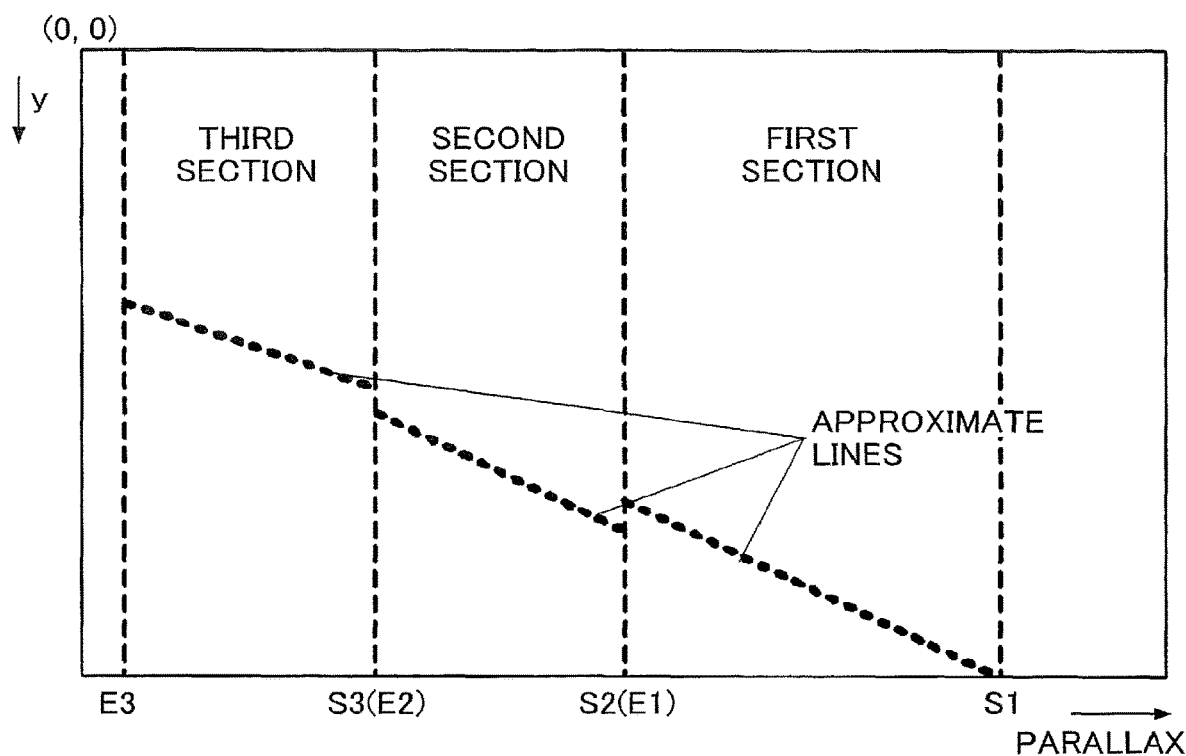
FIG. 17A is a diagram illustrating an example in which the approximate lines of sections obtained are not continuous at section boundaries.
Figure 17B:
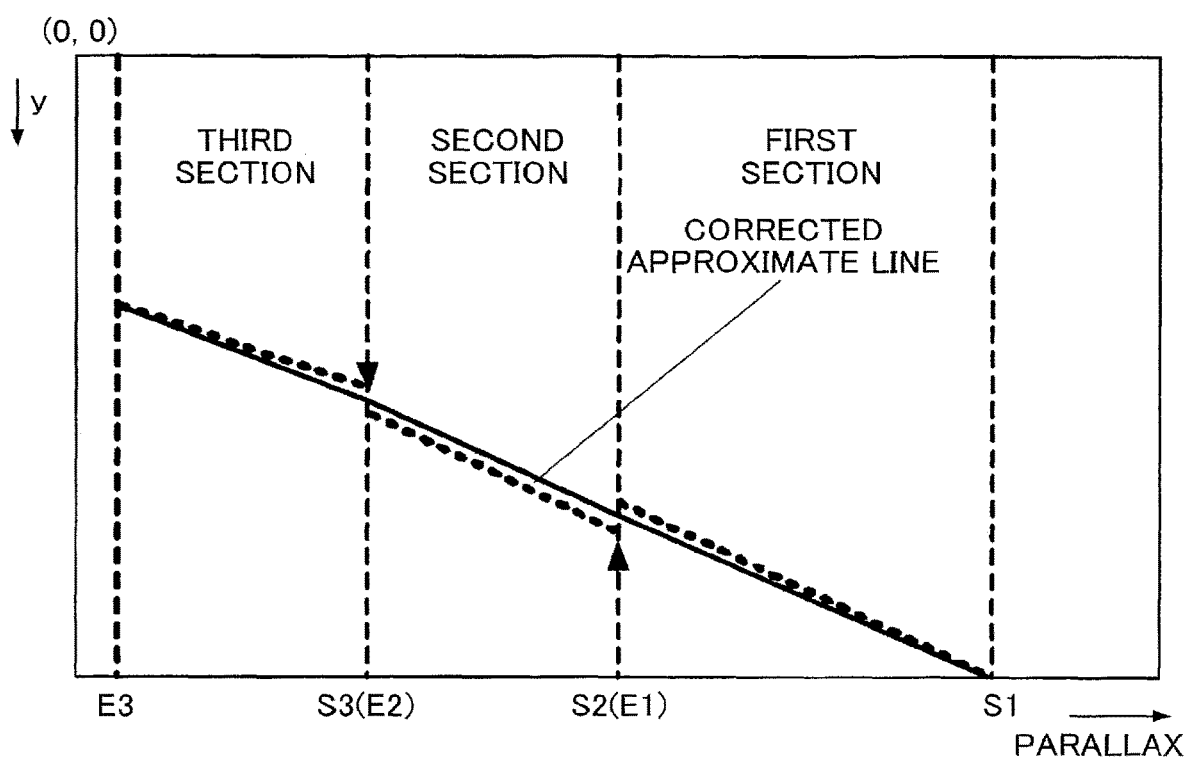
FIG. 17B is a diagram illustrating an example in which the approximate lines of the sections are corrected to be continuous at the section boundaries.

FIG. 14 is a flowchart for explaining a division linear approximation process performed by the division linear approximation unit 138b, FIG. 15A is a diagram illustrating original sections, and FIG. 15B is a diagram illustrating sections after the original first section is extended. Further, FIG. 16A is a diagram illustrating original sections, and FIG. 16B is a diagram illustrating sections after the original second section is extended. Further, FIG. 17A is a diagram illustrating an example in which the approximate lines of sections obtained are not continuous at section boundaries, and FIG. 17B is a diagram illustrating an example in which the approximate line of the sections are corrected to be continuous at the section boundaries.

At the start of the division linear approximation process of FIG. 14, the division linear approximation unit 138b receives the data of the road surface candidate points of the respective parallax values d from the road surface candidate point detection unit 138a, and sets up a first section related to the shortest distance and the greatest parallax value (step S91). The division linear approximation unit 138b extracts the road surface candidate points corresponding to the parallax values d within the first section (step S92). When the number of the extracted road surface candidate points is less than a predetermined reference number (step S93: NO), the first section is extended by a predetermined parallax value (step S94). Specifically, the original first and second sections as illustrated in FIG. 15A are combined into a single section (the extended first section) as illustrated in FIG. 15B. At this time, the original third section is changed to a new second section. Subsequently, the road surface candidate points corresponding to the parallax values d within the extended first section are extracted again (step S92) and when the number of the extracted road surface candidate points is greater than the reference number (step S93: YES), the linear approximation process is performed on the extracted road surface candidate points (step S95).

Note that, when extending the section different from the first section, such as the second section, the original second and third sections as illustrated in FIG. 16A are combined into a single section (the extended second section) as illustrated in FIG. 16B.

After the linear approximation process is performed in this way (step S96: NO), reliability evaluation of the approximate line obtained by the linear approximation process is performed. In this reliability evaluation, it is determined whether a slope and an intercept of the obtained approximate line are within predetermined ranges (step S97). When the slope and the intercept are not within the predetermined ranges (step S97: NO), the applicable first section is extended by a predetermined parallax value (step S94), and the linear approximation process is performed again with respect to the extended first section (steps S92 to S95). When the slope and the intercept are within the predetermined ranges (step S97: YES), it is determined whether the section on which the linear approximation process is performed is the first section (step S98).

When it is determined that the linear approximation process is performed on the first section (step S98: YES), it is determined whether a correlation value of the approximate line is greater than a predetermined value (step S99). When the correlation value of the approximate line is greater than the predetermined value (step S99: YES), the approximate line is determined as an approximate line of the applicable first section. When the correlation value of the approximate line is less than the predetermined value (step S99: NO), the applicable first section is extended by the predetermined parallax value (step S94), the linear approximation process is performed again with respect to the extended first section (steps S92 to S95), and the reliability evaluation is performed again (steps S97 to S99). Note that when the linear approximation process is performed on the section different from the first section (step S98: NO), the determination for the correlation value of the approximate line at step S99 is not performed.

Subsequently, it is determined whether there is a next section (step S100). When there is no next section (step S100: NO), the division linear approximation process is terminated by the division linear approximation unit 138b. On the other hand, when there is the next section (step S100: YES), the next section (e.g., the second section) is set up to have a width corresponding to a distance equivalent to the fixed multiple of a distance corresponding to the width of the preceding section (step S101). Subsequently, it is determined whether the set-up section is smaller than the following section (e.g., the third section) for the following setting (step S102). When it is determined that the set-up section is not smaller (step S102: NO), the road surface candidate points corresponding to the parallax values d within the applicable second section are extracted and the linear approximation process is performed (steps S92 to S95), the reliability evaluation is performed (steps S97 to S99).

In this way, the sections are set up sequentially and the linear approximation process and the reliability evaluation are performed on the sections repeatedly. Alternatively, it is determined at step S102 that the set-up section is smaller than the following section (step S102: YES). In this case, the set-up section is extended to include the following section as the final section (step S103). In this case, the road surface candidate points corresponding to the parallax values d within the final section are extracted (step S92), and the linear approximation process is performed on the extracted road surface candidate points (step S95). Ultimately, it is determined at step S96 that the processed section is the final section (step S96: YES). Then, the division linear approximation process is terminated by the division linear approximation unit 138b.

Usually, the approximate lines of the sections obtained when the linear approximation process is performed on the sections by the division linear approximation unit 138b, respectively, are not continuous at the section boundaries as illustrated in FIG. 17A. Hence, in this embodiment, the approximate line correction unit 138c is configured to correct the approximate lines output from the division linear approximation unit 138b, so that the approximate lines of the sections are continuous at the section boundaries as illustrated in FIG. 17B. Specifically, both the approximate lines are corrected to pass through a middle point between the end points of the approximate lines of the sections at the section boundary.

[Road Surface Height Table Computation]

After the information of the approximate lines of the V map is received from the road surface profile detection unit 138, a road surface height table computation unit 139 is configured to perform a road surface height table computation process which computes a road surface height (a height relative to the road surface portion directly below the vehicle) and generates a road surface height table. The distance to the road surface portion projected on each line area (each position in the image up/down direction) of the captured image is computed based on the information on the approximate lines of the V map generated by the road surface profile detection unit 138. On the other hand, it is known beforehand how each surface portion in the vehicle traveling direction of a virtual plane (extended in the vehicle traveling direction to be parallel to the surface of the road surface portion directly below the vehicle) projects on the line areas of the captured image. This virtual plane (reference road surface) is expressed by a straight line (reference line) on the V map. By comparing the approximate line output from the road surface profile detection unit 138 with the reference line, a height of each road surface portion in front of the vehicle is determined. In a simplified method, a height of the road surface portion existing in front of the vehicle at a distance obtained from the corresponding parallax value is computed based on the y-axis direction position on the approximate line output from the road surface profile detection unit 138. The road surface height table computation unit 139 generates a table in which the height of each road surface portion obtained from the approximate line is stored for the required parallax range.

Note that a height of an object from the road surface when the image portion of the object in the captured image corresponds to the point of the y-axis direction position y' for a certain parallax value d is computed by (y'−y0) where y0 denotes the y-axis direction position on the approximate line for the applicable parallax value d. Generally, the height H of the object corresponding to the coordinates (d, y') of the V map from the road surface is computed according to the following formula (2).

$$H = z \times (y'-y0)/f \quad (2)$$

where "z" denotes the distance (z=BF/(d−offset)) computed from the parallax value d, "f" denotes the value obtained when the focal distance of the camera is transformed into the same unit as the unit of (y'−y0). "BF" denotes the value obtained by multiplication of the base distance and the focal distance of the stereo camera, and "offset" denotes a parallax value when the object of infinity is captured.

[Parallax Pixel Data Extraction]

Next, a parallax pixel data extraction unit 140 will be described.

The parallax pixel data extraction unit 140 is configured to receive the parallax image data generated by the parallax image generation unit 132, and extract from each of the areas of the parallax image a group (x, y, d) of the x-axis direction position x, the y-axis direction position y of each parallax pixel data included in the parallax image data, and the parallax value d at an extraction rate according to the area. The parallax pixel data extraction unit 140 sets up different extraction rates of extracting pixel values for the areas in which the parallax image is divided into the areas in the horizontal direction. For example, the extraction rates set up for the lowermost area in the vertical direction, the uppermost area in the vertical direction, and the area near the center of the parallax image are in ascending order.

Figure 18:
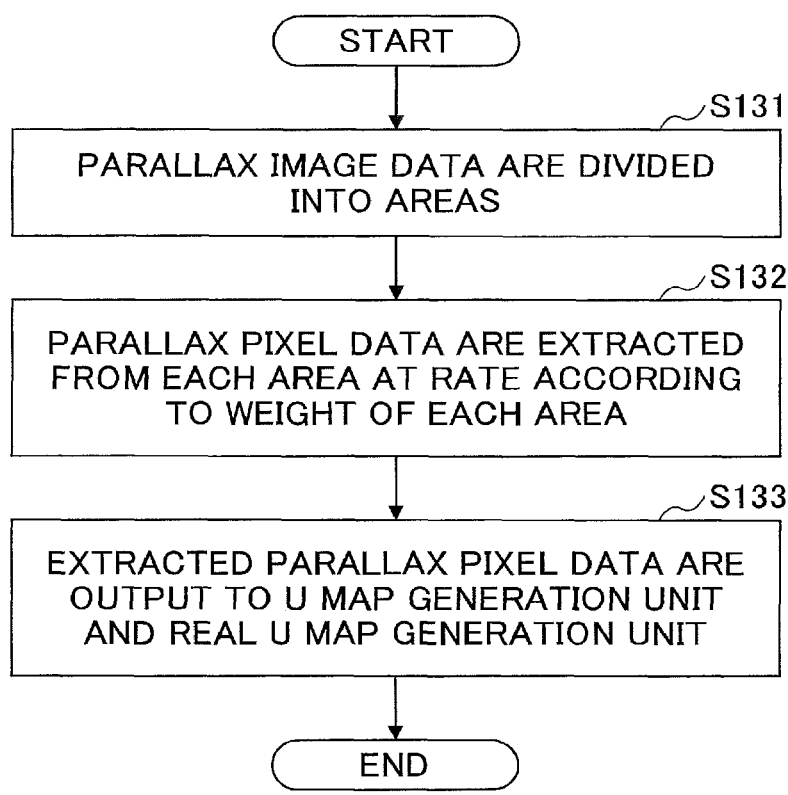
FIG. 18 is a flowchart for explaining a parallax pixel data extraction process.

Next, a parallax pixel data extraction unit 140 will be described with reference to FIG. 18. FIG. 18 is a flowchart for explaining a parallax pixel data extraction process performed by the parallax pixel data extraction unit 140.

At the start of the parallax pixel data extraction process of FIG. 18, the parallax pixel data extraction unit 140 divides the parallax image data at predetermined positions in the vertical direction into areas by straight lines parallel to the horizontal direction (the x-axis direction of the parallax image) (step S131).

The parallax pixel data extraction unit 140 extracts the parallax pixel data of each of the divided areas of the parallax image at the extraction rate according to the area (step S132).

The parallax pixel data extraction unit 140 outputs the extracted parallax pixel data to each of a U map generation unit 141 and a real U map generation unit 142 (step S133).

Next, with reference to FIG. 19, the process of dividing the parallax image data into areas at step S131 of FIG. 18 will be described.

Figure 19:
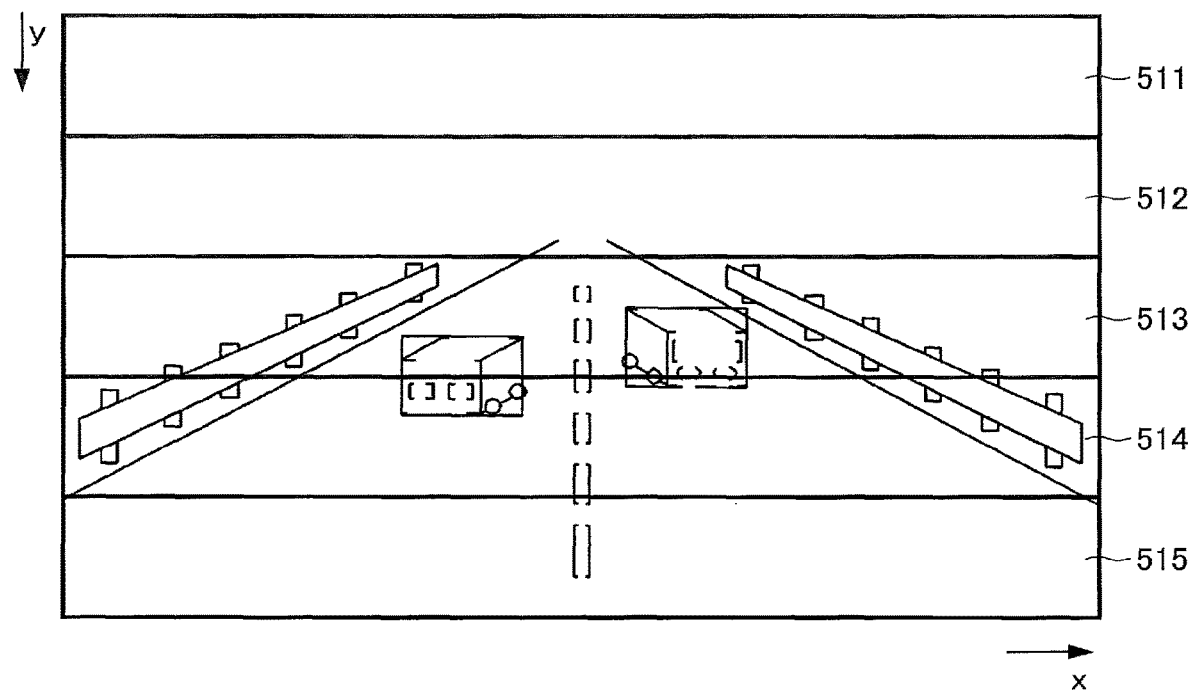
FIG. 19 is a diagram for explaining a process in which parallax image data is divided into areas by straight lines parallel to a horizontal direction.

FIG. 19 is a diagram for explaining a process in which the parallax image data is divided into areas by straight lines parallel to the horizontal direction. In the example of FIG. 19, the parallax image data is divided at equal intervals into five areas (which are designated by the reference numerals 511 to 515 sequentially in the direction from top to bottom). The number of divided areas is optional, and the intervals between the areas may not be equal.

Next, with reference to FIG. 20, the process of extracting the parallax pixel data at step S132 of FIG. 18 will be described.

Figure 20:
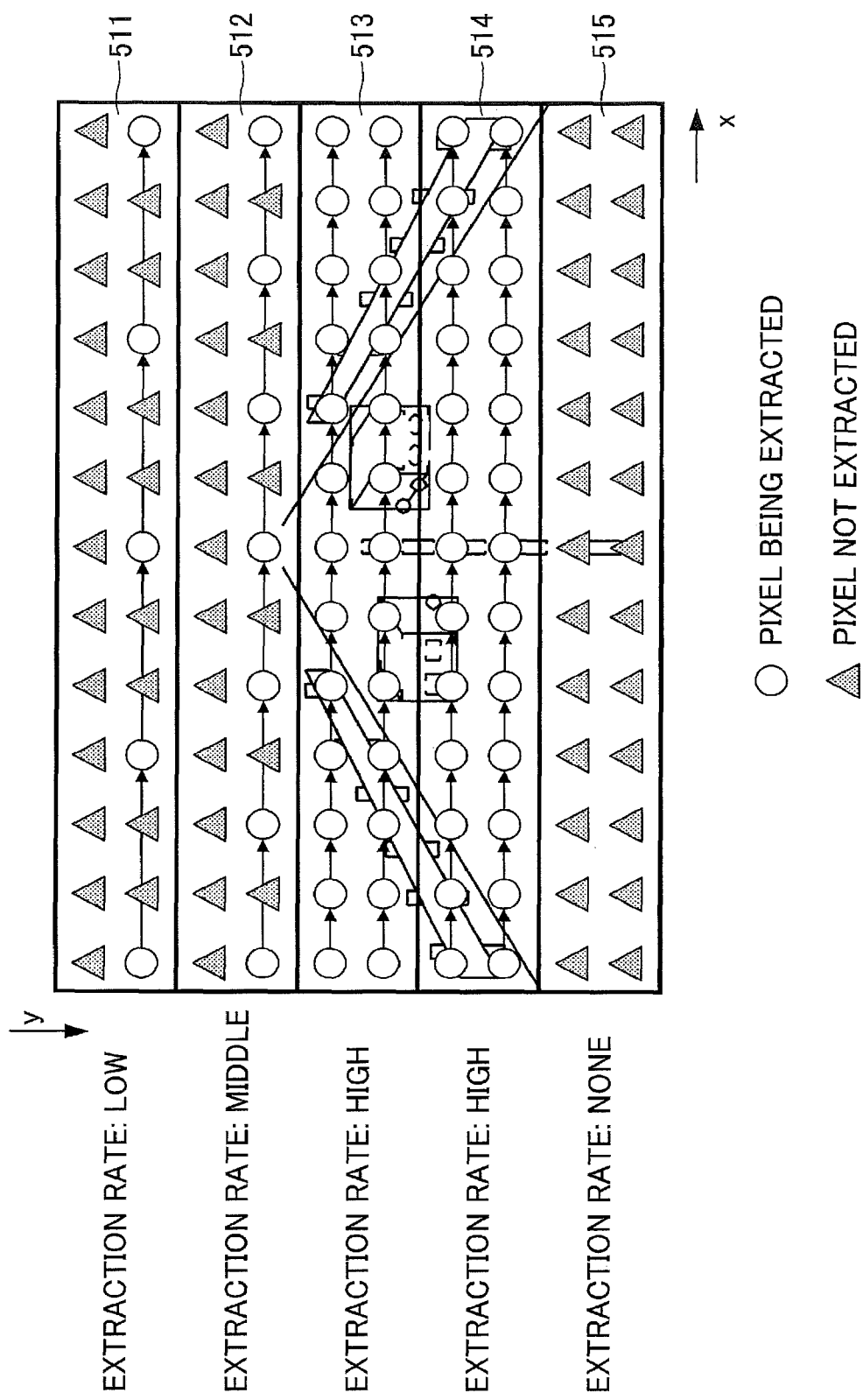
FIG. 20 is a diagram for explaining a process to extract parallax pixel data.

In the example of FIG. 20, the extraction rate for the uppermost area 511 (an example of a second area) is set to a low rate (an example of a second rate), and the parallax pixel data included in the area 511 are extracted at a low rate. Hence, except for a tall object, such as a truck, the processing to extract the parallax pixel data of the hardly used area may be reduced.

The extraction rate for the area 512 is set to a middle rate, and the parallax pixel data included in the area 512 are extracted at the middle rate. This rate may be used for detection of distant vehicles or people and trucks with a great height. Because of the detection of distant objects, the processing to extract the parallax pixel data of the areas with a low detection priority may be reduced taking into consideration the characteristics of the in-vehicle camera.

The extraction rate for the areas 513 and 514 (an example of a first area) is set to a high rate (an example of a first rate), and the parallax pixel data included in the areas 513 and 514 are extracted at a high rate. Hence, many parallax pixel data items of the area in which the frequency of appearance of vehicles or persons as important candidates for detection is high are extracted, and the level of accuracy of measurement for an important detection target may be maintained.

The extraction rate for the lowermost area 515 (an example of a third area) is set to zero (an example of a third rate), and the parallax pixel data included in the area 515 are not extracted. Hence, the processing to extract the parallax pixel data of the road surface may be prevented.

For example, when the number of pixels of parallax image data is 1280×800 pixels, the parallax pixel data extraction unit 140 may be configured so that, if a low rate, a middle rate, and a high rate are set up for the pixels of all the areas as an extraction rate, the pixel values (the parallax pixel data) are extracted at any rate of 1/100, 1/50, or 1/3 from the corresponding area.

Figure 21:
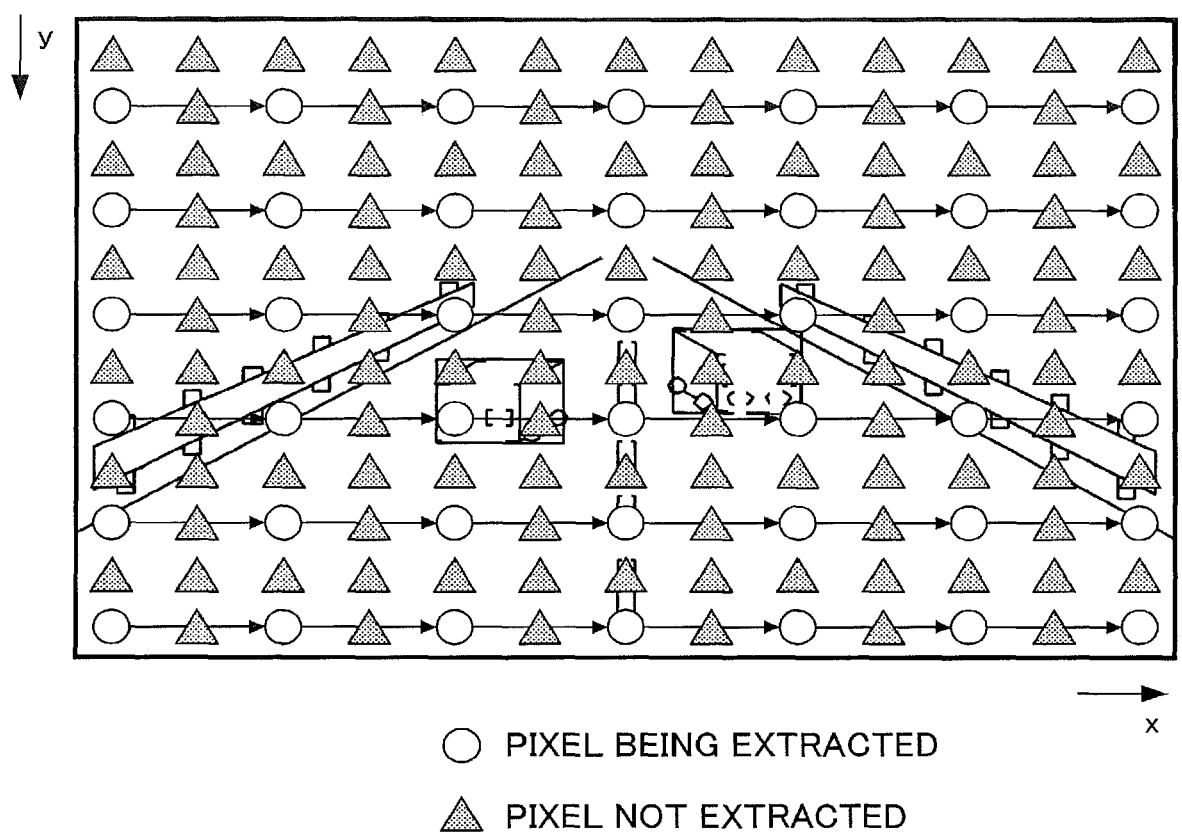
FIG. 21 is a diagram for explaining a case in which pixels of parallax pixel data to be extracted are simply thinned out.

Next, a case in which the pixels of the parallax pixel data to be extracted are simply thinned out will be described with reference to FIG. 21. FIG. 21 is a diagram for explaining the case where the pixels of the parallax pixel data to be extracted are simply thinned out.

In the example of FIG. 21, the pixels of the parallax pixel data to be extracted are thinned out at equal intervals. In this case, the processing to extract the pixels of the parallax pixel data is reduced. However, the number of times that the parallax pixel data for an important detection target are extracted is also reduced, and when compared with the above-described embodiment, the level of accuracy of the measurement is lowered.

In this embodiment, the tendency of a position where a detection target (an automotive vehicle, a person, or a similar object) appears, and the tendency of the parallax pixels based on the results of detection of the target object are estimated beforehand by utilizing many stereo image groups including the detection target. Based on the estimation, the rate of extracting the parallax pixel data from each of the areas is set up.

For example, it is assumed that the in-vehicle stereo camera is disposed in the vehicle so as to set the center of the parallax image to a vanishing point. In this case, it is found from the experimental results that the frequency that a vehicle or a person as a detection target appear in the areas slightly below the center of the parallax image is much higher that the frequency that they appear in other areas.

It is possible to recognize the object of the detection target at a high speed by extracting the important parallax pixel data at a high rate in accordance with the above tendency.

[U Map Generation]

Next, the U map generation unit 141 will be described. The U map generation unit 141 is configured to perform a frequency U map generation process and a height U map generation process, which are performed as a U map generation process to generates a U map (U-disparity map; an example of data indicating a parallax distribution of an object).

In the frequency U map generation process, based on the group (x, y, d) of the x-axis direction position x, the y-axis direction position y, and the parallax value d in each parallax pixel data included in the parallax image data, extracted by the parallax pixel data extraction unit 140, the x-axis direction position x is set to the x-axis, the parallax value d is set to the y-axis, and the frequency is set to the z-axis, so that two-dimensional histogram information of X-Y is generated. This histogram information is called a frequency U map. The U map generation unit 141 of this embodiment generates a frequency U map only for the point (x, y, d) of the parallax image having a height H from the road surface in a predetermined height range (e.g., the range from 20 cm to 3 m) based on the height of each road surface portion of the table generated by the road surface height table computation unit 139. In this case, an object existing in the predetermined height range from the road surface may be extracted appropriately.

In the height U map generation processing, based on the group (x, y, d) of the x-axis direction position x, the y-axis direction position y, and the parallax value d in each parallax pixel data included in the parallax image data, extracted by the parallax pixel data extraction unit 140, the x-axis direction position x is set to the x-axis, the parallax value d is set to the y-axis, the height from the road surface is set to the Z-axis, so that two-dimensional histogram information of X-Y is generated. This histogram information is called a height U map. The value of the height at this time is the highest height from the road surface.

Figure 22:
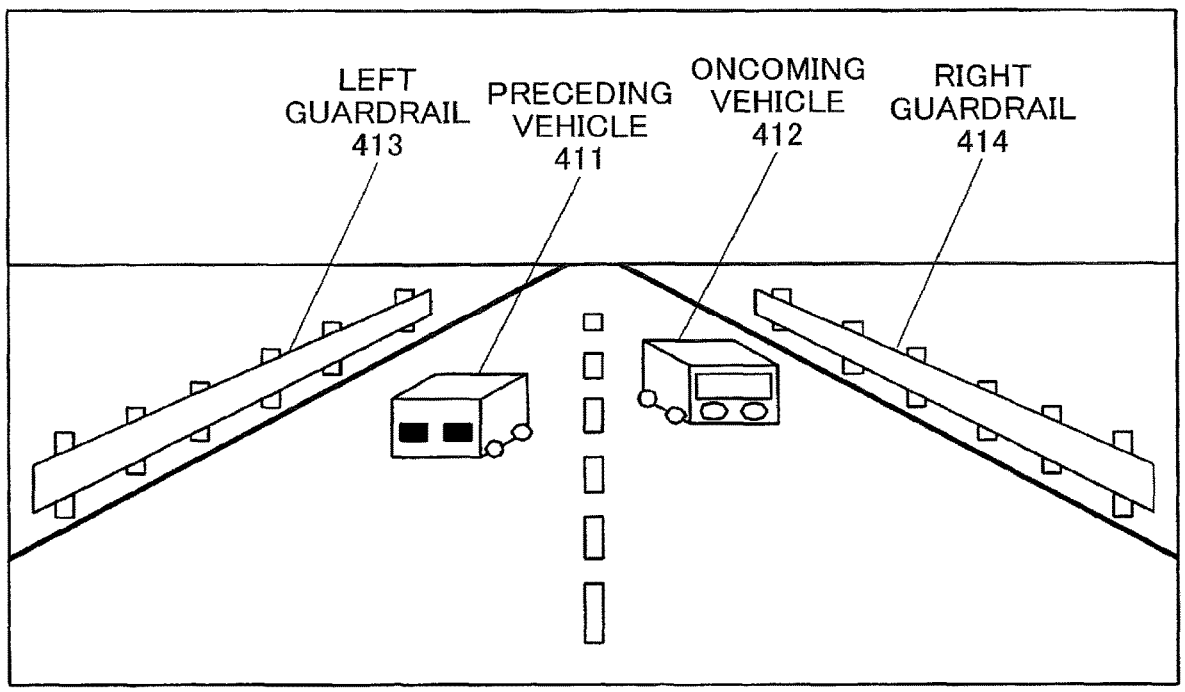
FIG. 22 is a diagram illustrating an example of a reference image.

FIG. 22 illustrates an example of a reference image obtained by the imaging unit 110a. FIG. 23A and FIG. 23B illustrate U maps corresponding to the reference image of FIG. 22. Specifically, FIG. 23A illustrates a frequency U map and FIG. 23B illustrates a height U map.

In the example illustrated in FIG. 22, guardrails 413 and 414 exist on left and right sides of a road surface, and a preceding vehicles 411 and an oncoming vehicle 412 exist on the road surface. At this time, in the frequency U map illustrated in FIG. 23A, the points of high frequency corresponding to the left and right guardrails 413 and 414 are distributed along the approximately straight lines 603 and 604 which extend upward to a central portion from the left end portion and the right end portion. On the other hand, the points of high frequency corresponding to the preceding vehicles 411 and the oncoming vehicle 412 are distributed along the line segments 601 and 602 which extend approximately in parallel with the x-axis direction between the left and right guardrails. When the other portions of these vehicles 411 and 412 different from the rear portion of the preceding vehicle 411 and the front portion of the oncoming vehicle 412 are projected, parallax arises in the imaging range in which these vehicles are projected. In such a case, the points of high frequency corresponding to these vehicles are distributed along line segments extending approximately in parallel with the x-axis direction which are connected to slanting line segments to the x-axis direction as illustrated in FIG. 23A.

In the height U map, the points of the greatest height from the road surface corresponding to the left and right guardrails 413 and 414, the preceding vehicle 411, and the oncoming vehicle 412 are distributed in a manner similar to the frequency U map. In this example, the height of a distribution 701 of points corresponding to the preceding vehicle and a distribution 702 of points corresponding to the oncoming vehicle is higher than the height of distributions 703 and 704 of points corresponding to the guardrails. Thereby, the height information of objects in the height U map may be used for the object detection.

[Real U Map Generation]

Next, a real U map generation unit 142 will be described. The real U map generation unit 142 is configured to perform a U map generation process which generates a real U map (real U-disparity map), which is an example of data indicating a parallax distribution of an object. The U map generation process includes a real frequency U map generation process and a real height U map generation process.

The real U map is generated by transforming each of the pixels of the image along the horizontal axis of the U map into an actual distance and by transforming a parallax value along the vertical axis into a thin-out parallax having a thin-out rate according to the distance.

In the real frequency U map generation process, the real U map generation unit 142 generates a two-dimensional histogram information of X-Y by setting the actual distance in the horizontal direction to the x-axis, setting the thin-out parallax to the y-axis, and setting the frequency to the z-axis, based on the group (x, y, d) of the x-axis direction position x, the y-axis direction position y, and the parallax value d of each parallax pixel data included in the parallax image data extracted by the parallax pixel data extraction unit 140. Similar to the U map generation unit 141, the real U map generation unit 142 of this embodiment generates the real frequency U map for only the points (x, y, d) of the parallax image having the height H from the road surface within the predetermined height range, based on the height of each road surface portion of the table from the road surface height table computation unit 139. Note that the real U map generation unit 142 may be configured to generate a real U map based on the U map generated by the U map generation unit 141.

Figure 24:
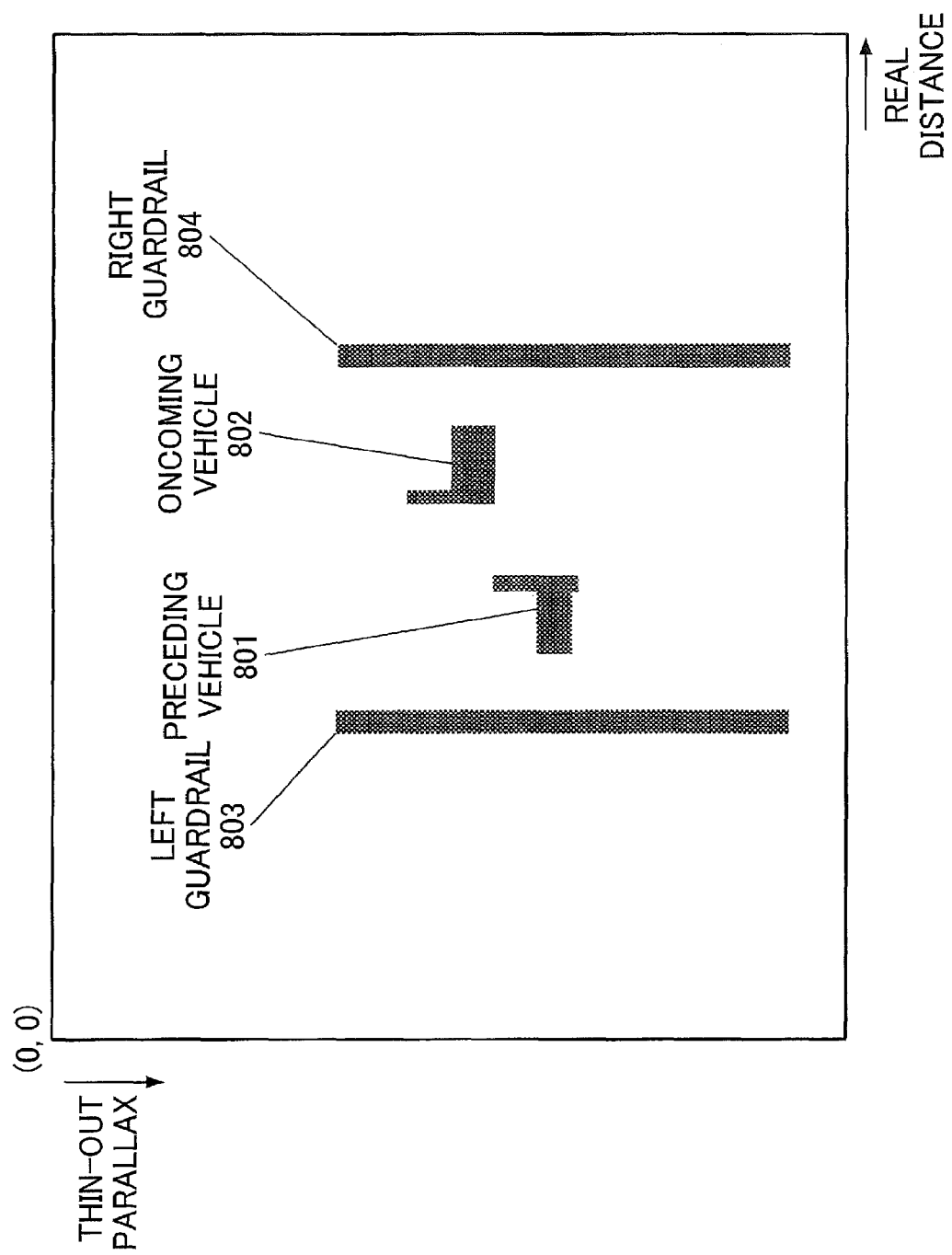
FIG. 24 is a diagram illustrating a real U map corresponding to a U map.

FIG. 24 is a diagram illustrating the real U map (the real frequency U map) corresponding to the frequency U map illustrated in FIG. 23A. As illustrated in FIG. 24, the left and right guardrails are expressed by vertical linear patterns 803 and 804, and the preceding vehicle and the oncoming vehicle are also expressed by patterns 801 and 802 which are similar to the actual form.

The thin-out parallax of the vertical axis is defined such that no thin-out parallax is set up for the long distance (50 m or greater), ½ thin-out parallax is set up for the middle distance (greater than 20 m and less than 50 m), ⅓ thin-out parallax is set up for the short distance (greater than 10 m and less than 20 m), and ⅛ thin-out parallax is set up for the very short distance (greater than 5 m and less than 10 m).

Namely, the thin-out amount is reduced as the distance increases. An image of an object at a short distance is small, the amount of the parallax data is small and the distance resolution is small, so the thin-out amount is reduced. Conversely, an image of an object at a short distance is great, the amount of the parallax data is great and the distance resolution is great, so the thin-out amount is increased.

A method of transforming the pixels of an image along the horizontal axis into the actual distance, i.e., a method of determining (X, d) of the real U map from (x, d) of the U map will be described with reference to FIG. 25.

A width between a left position and a right position both at a distance of 10 m from the camera, i.e., a width of 20 m, is as an object detection range. Supposing that the width of one pixel in the lateral direction of the real U map is equal to 10 cm, the lateral direction size of the real U map amounts to the width of 200 pixels.

Figure 25:
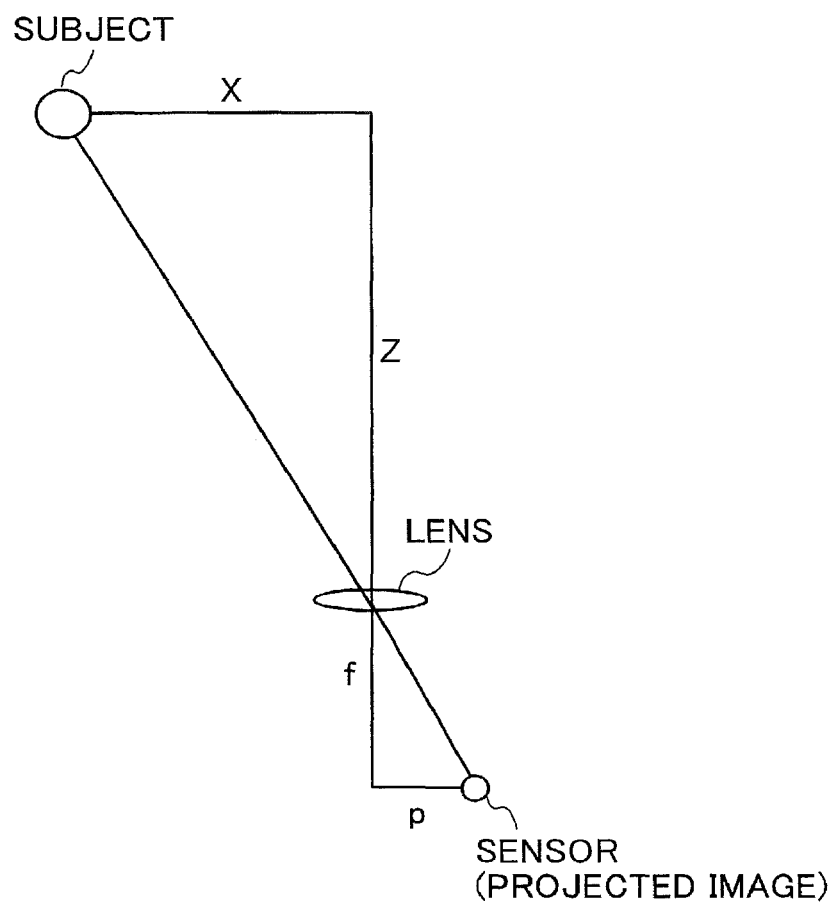
FIG. 25 is a diagram for explaining a method for computing a value of a horizontal axis of the real U map from a value of a horizontal axis of the U map.

In FIG. 25, "f" denotes the focal distance of the camera, "p" denotes the position in the lateral direction of the sensor from the camera center, "Z" denotes the distance from the camera center to the subject, and "X" denotes the position in the lateral direction of the subject from the camera center. Supposing that "s" denotes the pixel size of the sensor, the relationship between x and p is represented by the equation "$x=p/s$". Further, the equation "$Z=Bf/d$" holds from the characteristics of the stereo camera.

Further, as illustrated in FIG. 25, the equation "$x=p\times Z/f$" holds, and the equation "$X=s\times B/d$" also holds. X denotes the real distance. Because the width of one pixel in the lateral direction of the real U map is equal to 10 cm, the position X in the real U map can be readily computed.

A real U map corresponding to the height U map illustrated in FIG. 23B (the real height U map) can also be generated in the same procedure.

The real U map has a height in the lateral or vertical direction smaller than that of the U map, and allows high speed processing. Further, the real U map in the lateral direction does not depend on the distance, and the same object can be detected with the same width regardless of the distance. This allows the subsequent processes of peripheral area removal and determination as to horizontal separation or vertical separation (width threshold processing) to be easily performed.

The height of the U map is determined by the smallest distance of the stereo camera. The greatest value of d is determined according to the equation "$d=Bf/Z$". Usually, the parallax value d is computed in units of pixels when a stereo image is processed. However, the parallax value d includes a decimal portion. In the following, the parallax value is multiplied by 32, and the decimal portion of the resulting parallax value is rounded off to the nearest integer, which will be used for the sake of convenience of description.

For example, in a case of the stereo camera having the smallest distance of 4 m and the pixel-based parallax value of 30, the height of the U map is set to 30×32=960. Further, in a case of the stereo camera having the smallest distance of 2 m and the pixel-based parallax value of 60, the height of the U map is set to 60×32=1920.

When Z is changed to ½, the parallax value d is doubled, and the data in the height direction of the U map is greatly increased. Hence, when generating the real U map, a great thin-out amount is needed for a short distance place to compress the data in the height direction.

In the case of the above camera, the parallax value for 50 m is 2.4 pixels, the parallax value for 20 m is 6 pixels, the parallax value for 8 m is 15 pixels, and the parallax value for 2 m is 60 pixels. Hence, no thin-out amount is set for the distance of 50 m or greater, the thin-out amount of ½ is set for the distance of less than 50 m and greater than 20 m, the thin-out amount of ⅓ is set for the distance of less than 20 m and greater than 8 m, and the thin-out amount of ¹⁄₁₅ is set for the distance of less than 8 m.

In this case, the height for the distance from infinity to 50 m is set to 2.4×32=77, the height for the distance from 50 m to 20 m is set to (6−2.4)×32/2=58, the height for the distance from 20 m to 8 m is set to (15−6)×32/3=96, and the height for the distance of less than 8 m is set to (60−15)×32/15=96. As a result, the overall height of the real U map is set to (77+58+96+96=327. This height is much smaller than the height of the U map, and it is possible to perform the object detection by labeling at high speed.

[Isolated Region Detection]

Figure 26:
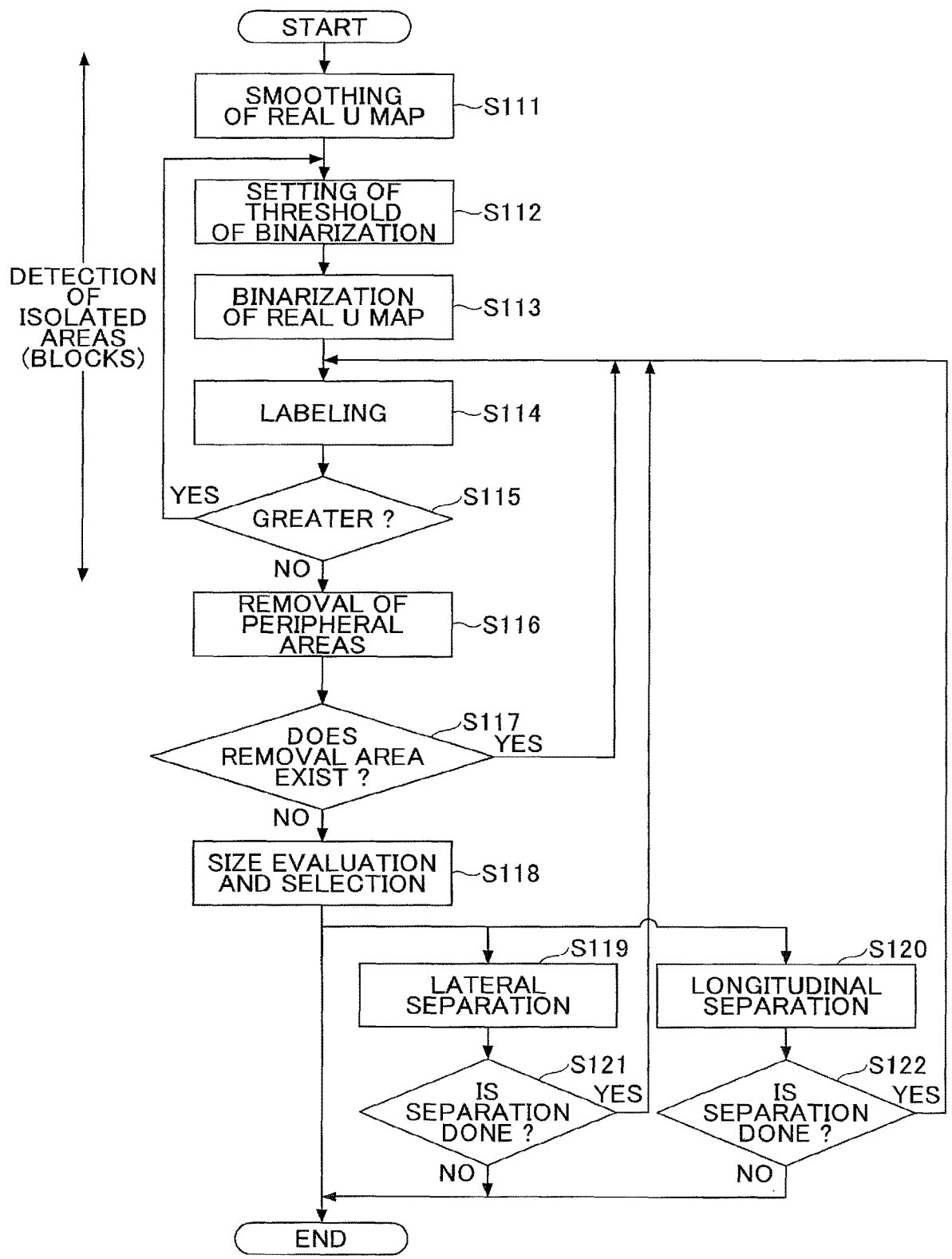
FIG. 26 is a flowchart for explaining an isolated region detection process performed by an isolated region detection unit.

Next, an isolated region detection unit 143 will be described. FIG. 26 is a flowchart for explaining an isolated region detection process performed by the isolated region detection unit 143. The isolated region detection unit 143 is configured to perform smoothing of the information of the frequency real U map generated by the real U map generation unit 142 (step S111).

The frequency value is averaged in order to facilitate the detection of an effective isolated region. Strictly speaking, the parallax value may include a computation error and the parallax value is not always computed for all pixels. Unlike the example illustrating in FIG. 24, the real U map includes a noise. To remove the noise and facilitate the separation of the object to be detected, the real U map is smoothed. Similar to the smoothing of an image, a smoothing filter (e.g., 3×3 pixels arithmetic averaging filter) is applied to the frequency value of the real U map (frequency real U map). By the application of the smoothing filter, the frequency which is regarded as the noise can be reduced, and the frequency in the object portion which is greater than that of the peripheral portions can be collected, which will facilitate the subsequent isolated region detection process.

Subsequently, a binarization threshold is set up (step S112). Initially, the smoothed real U map is binarized using a small threshold value (=0) (step S113). Then, labeling of coordinates with an increased threshold value is performed and an isolated region is detected.

The labeling is performed to detect an island after the binarization (step S114). The labeling of the coordinates (coordinates whose frequency value is greater than a binarization threshold) which indicate the black after the binarization is performed based on the connectivity, and the area with the same label is regarded as an island.

A size of each of the detected isolated regions is determined (step S115). The candidate for detection may include a pedestrian and a large-sized vehicle, and it is determined at this step whether the width of each isolated region is greater than a binarization threshold. When the width is greater than the binarization threshold (step S115: YES), the binarization threshold is incremented (step S112), and binarization of the corresponding isolated region of the real frequency U map is performed (step S113). Then, labeling is performed to detect a smaller isolated region (step S114), and the size of the isolated region is determined (step S115).

The labeling process is performed repeatedly based on the set-up threshold, and an isolated region of a desired size is detected. When the isolated region of the desired size is detected (step S115: NO), peripheral area removal is performed (step S116). The peripheral area removal is a process of removing the areas (peripheral areas in the isolated region) from the isolated region when an image of a long distant object is captured and the level of accuracy of the road surface detection is low. When a removal area exists (step S117: YES), the labeling is performed again and the resetting of the isolated region is performed (step S114).

When the removal area does not exist (step S117: NO), the size (width and height) of the isolated region in which performed the peripheral area removal is performed is determined (step S118). According to the result of the determined size, lateral separation (step S119) or longitudinal separation (step S120) is performed to register the isolated region as an object candidate. When the lateral separation or the longitudinal separation is performed (step S121: YES, step S122: YES), the labeling is performed again and the resetting of the isolated region is performed (step S114).

When two objects, such as an automotive vehicle and a motorbike, an automotive vehicle and a pedestrian, and two vehicles, are laterally close to each other, it may be detected as an isolated region due to the smoothing of the real frequency U map. Or the parallax of different objects may be connected due to the adverse effect of parallax interpolation of the parallax image. Lateral separation is performed to detect such cases and separate the objects (which will be described later).

When a plurality of preceding vehicles are running on the adjacent lane, they exist far away and the distribution of the parallax obtained from the stereo image is large, there may be a case in which the parallax value of each object is extended up or down on the real frequency U map, and they are connected together. This may be detected as an isolated region. Longitudinal separation is performed to detect such a case and divide the preceding vehicles into the preceding vehicles running on this side and the preceding vehicles running on the other side (which will be described later).

[Parallax Image Correspondence Region Detection and Object Region Extraction]

Figure 27:
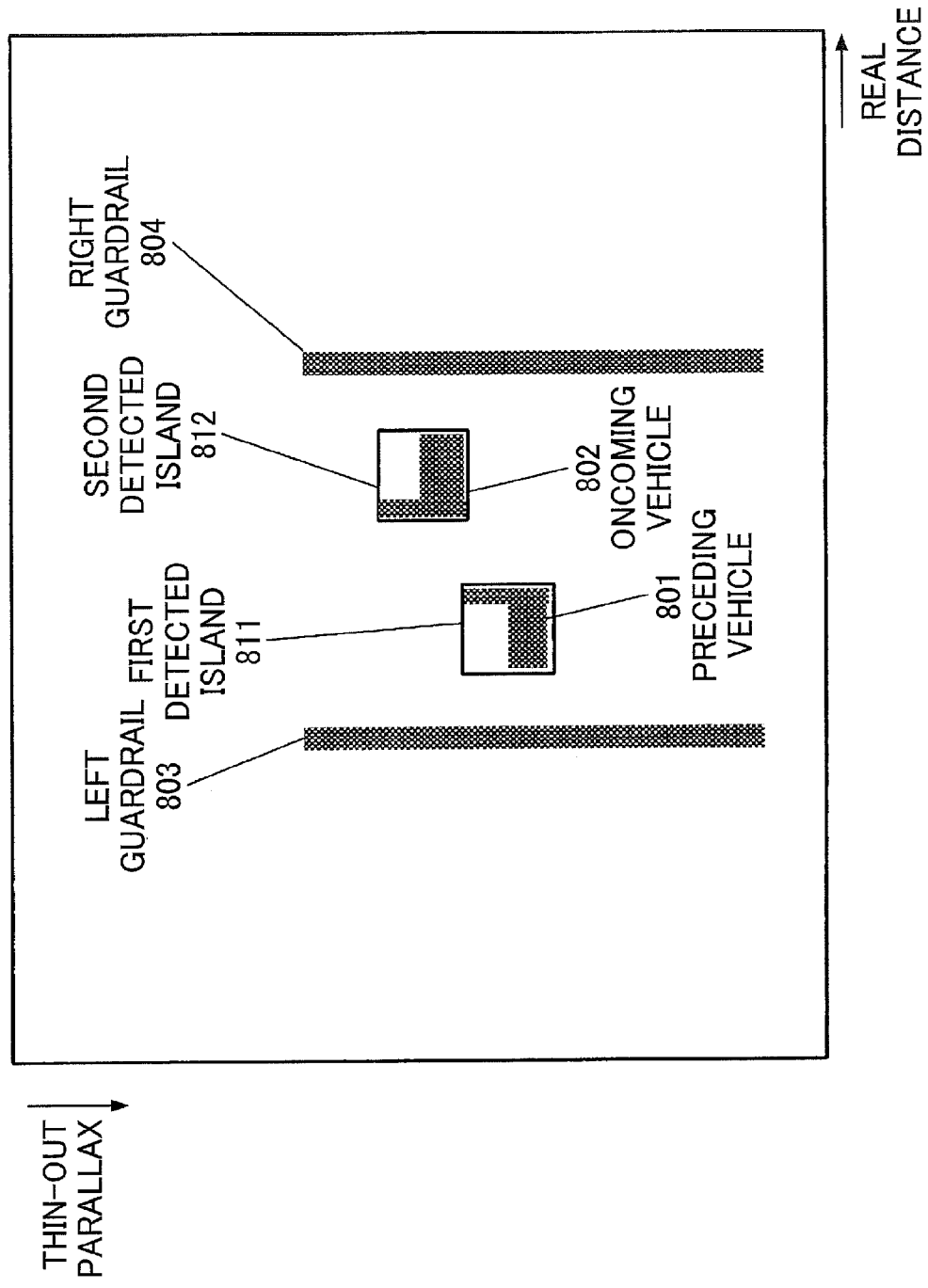
FIG. 27 is a diagram illustrating a real frequency U map in which a rectangular area in which an isolated region detected by the isolated region detection unit is inscribed is set up.
Figure 28:
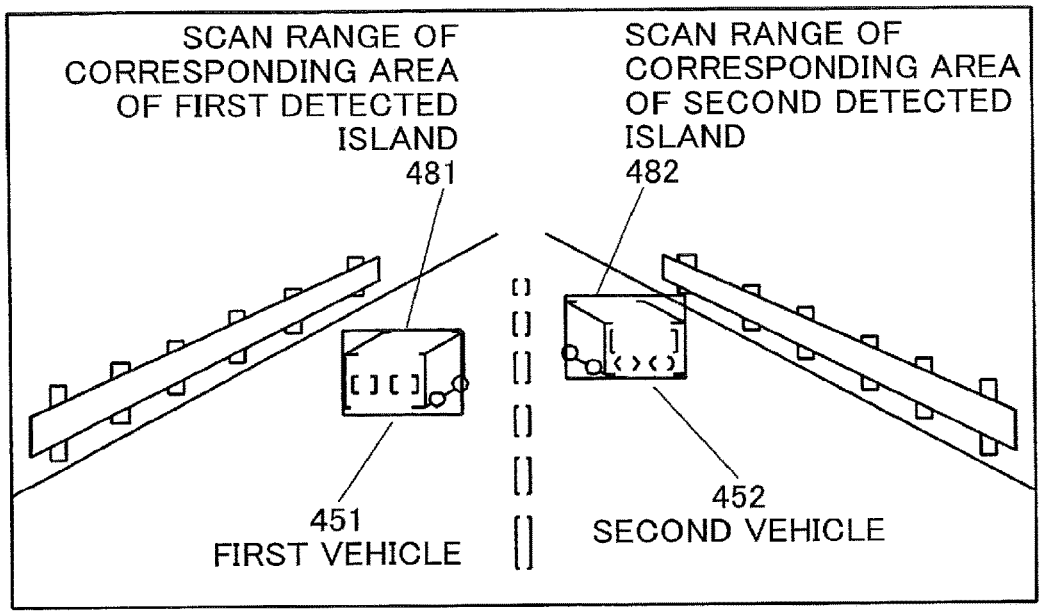
FIG. 28 is a diagram illustrating a parallax image in which a scan range corresponding to the rectangular area is set up.
Figure 29:
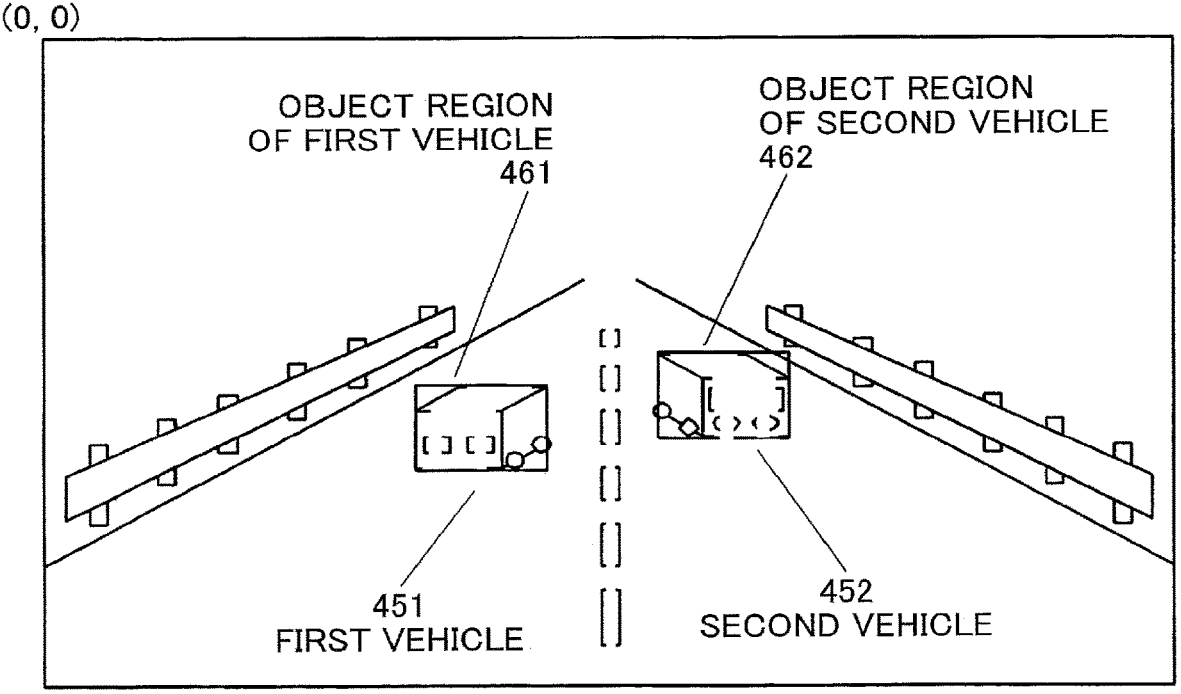
FIG. 29 is a diagram illustrating a parallax image in which an object region is set up by searching for the scan range.

Next, a parallax image correspondence region detection unit 144 and an object region extraction unit 145 will be described. FIG. 27 is a diagram illustrating a real frequency U map in which a rectangular area in which an isolated region detected by the isolated region detection unit is inscribed is set up. FIG. 28 is a diagram illustrating a parallax image in which a scan range corresponding to the rectangular area in FIG. 27 is set up. FIG. 29 is a diagram illustrating a parallax image in which an object region is set up by searching for the scan range in FIG. 28.

Regarding the isolated region determined by the isolated region detection unit 143 as an object candidate area, as illustrated in FIG. 27, when a first detected island 811 and a second detected island 812 are set up as a rectangular area in which a first vehicle 801 and a second vehicle 802 are inscribed as an applicable isolated region, the width (the length in the X-axis direction on the U map) of this rectangular area is equivalent to the width of the target object corresponding to the isolated region. The height of the set-up rectangular area is equivalent to the depth (the length in the vehicle traveling direction) of the target object corresponding to the isolated region. On the other hand, the height of the target object corresponding to each isolated region is unknown at this stage. The parallax image correspondence region detection unit 144 detects a corresponding area on the parallax image corresponding to the isolated region, in order to obtain the height of the object corresponding to the isolated region related to the object candidate area.

Based on the information of the isolated region output from the isolated region detection unit 143, the parallax image correspondence region detection unit 144 determines X-axis direction ranges (xmin, xmax) of a scan range 481 of the first detected island corresponding area and a scan range 482 of the second detected island corresponding area, which are to be detected in the parallax image illustrated in FIG. 28, from the positions, widths and the minimum parallax of the first detected island 811 and the second detected island 812 detected from the real U map. Further, the parallax image correspondence region detection unit 144 determines a height and a position of the object (from ymin (y coordinate value corresponding to the maximum height from the road surface at the time of the maximum parallax dmax) to ymax (y coordinate value indicating the height of the road surface obtained from the maximum parallax dmax) in the parallax image.

Subsequently, in order to detect the exact position of the object, scanning is performed in the set-up scan ranges, and pixels having parallax values within the range of the depth (the minimum parallax dmin, the maximum parallax dmax) of the rectangle detected by the isolated region detection unit 143 are extracted as candidate pixels. Then, a line exceeding a predetermined rate of the detection width in the lateral direction among the extracted candidate pixels is regarded as a candidate line.

Subsequently, the scanning is performed in the longitudinal direction, and, when a density of other object candidate lines existing around an object candidate line currently observed is greater than a predetermined density, the object candidate line currently observed is determined as being an object line.

Subsequently, the object region extraction unit 145 searches for an object line in a search area of the parallax image and determines a lowermost end and an uppermost end of the object line. As illustrated in FIG. 29, circumscribed rectangles 461 and 462 of the object lines are determined as the areas 451 and 452 of the objects (the first vehicle, the second vehicle) in the parallax image.

Figure 30:
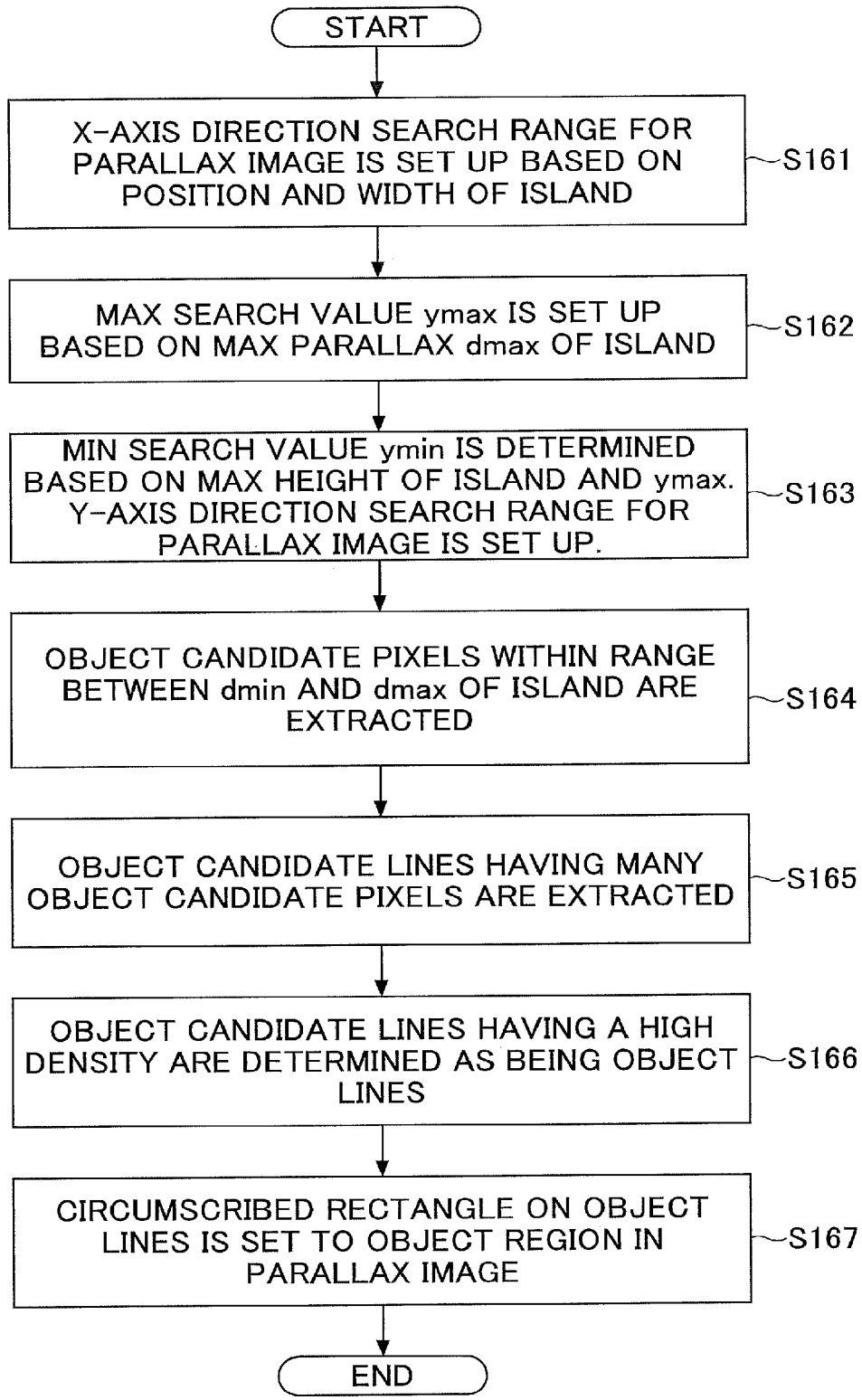
FIG. 30 is a flowchart for explaining a process performed by a parallax image correspondence region detection unit and an object region extraction unit.

FIG. 30 is a flowchart for explaining a process performed by the parallax image correspondence region detection unit 144 and the object region extraction unit 145.

A search range of the x-axis direction for the parallax image is set up based on the position, the width, and the minimum parallax of the island in the real U map (step S161).

Subsequently, a maximum search value ymax of the y-axis direction for the parallax image is set up based on the relationship between the maximum parallax dmax of the island and the road surface height (step S162). Subsequently, the search range of the y-axis direction for the parallax image is set up by determining a minimum search value ymin of the y-axis direction for the parallax image based on the maximum height of the island in the real height U map and the ymax and the dmax set up at step S172 (step S163).

Subsequently, the parallax image in the search range is searched for, and the pixels within the range between the minimum parallax dmin and the maximum parallax dmax of the island are extracted, and the pixels are determined as the object candidate pixels (step S164). When a density of the object candidate pixels in the lateral direction is greater than a predetermined value, the line is extracted as an object candidate line (step S165).

A density of object candidate lines is computed, and when the density is greater than a predetermined value, the lines are determined as object lines (step S166). Finally, the circumscribed rectangle of the object line group is detected as the object region in the parallax image (step S167).

[Object Type Classification]

Next, an object type classification unit 146 (see FIG. 4) will be described.

An actual height Ho of the target object projected in the imaging range corresponding to the object region is computed from the height (yomax−yomin) of the object region extracted by the object region extraction unit 145, based on the following formula (5).

$$Ho = zo \times (y\text{omax} - y\text{omin})/f \tag{5}$$

where "zo" denotes a distance between the object and the vehicle corresponding to the applicable object region computed from the minimum parallax value d in the applicable object region, and "f" denotes a value obtained by transforming the focal distance of the camera in the unit that is the same as the unit of the height (yomax−yomin).

Similarly, an actual width Wo of the target object projected in the imaging range corresponding to the object region is computed from the width (xomax−xomin) of the object region extracted by the object region extraction unit 145, based on the following formula (6).

$$Wo = zo \times (x\text{omax} - x\text{omin})/f \tag{6}$$

Further, a depth Do of the target object projected in the imaging range corresponding to the applicable object region is computed from the maximum parallax dmax and the minimum parallax dmin in the isolated region corresponding to the applicable object region, based on the following formula (7).

$$Do = BF \times \{(1/(d\text{min} - \text{offset}) - 1/(d\text{max} - \text{offset})\} \tag{7}$$

The object type classification unit 146 is configured to determine an object type classification based on the information of the height, the width, and the depth of the object corresponding to the object region which are computed in this way. The table illustrated in FIG. 31 is an example of a table data for object type classification. According to this table data, it is possible to recognize a target object existing in front of the vehicle as being a pedestrian, a bike, a compact car, or a truck.

[Three-Dimensional Position Determination]

Next, a three-dimensional position determination unit 147 (see FIG. 4) will be described. The distance to the object corresponding to the detected object region, and the distance on the image between the image center of the parallax image and the center of the object region in the parallax image are recognized as described above, and the three-dimensional position of the object can be determined.

It is assumed that the center coordinates of the object region in the parallax image are set to (region_centerX, region_centerY) and the image center coordinates of the parallax image are set to (image_centerX, image_centerY). A relative lateral direction position Xo and a height direction position Yo of a target object to the imaging units 110a and 110b are computed based on the following formulas 8 and 9.

$$Xo = Z \times (\text{region\_center}X - \text{image\_center}X)/f \tag{8}$$

$$Yo = Z \times (\text{region\_center}Y - \text{image\_center}Y)/f \tag{9}$$

[Object Matching]

Next, an object matching unit 148 (see FIG. 4) will be described. The object matching unit 148 is configured to perform comparison matching between each of the object regions detected from a captured image in a certain captured frame and the data list in which S=0 from the object data list 135. The object region matched by the comparison matching is classified into "matched" noting that the object region is the same as that of the matched object in the object data list 135, which is the previously detected object (e.g., the previously captured frame). On the other hand, the object region which is not matched with the object in the object data list 135 is classified into "new object" as a newly detected object. The information related to the object region classified into "new object" is newly added to the object data list 135.

After the comparison matching is performed, the object in the object data list 135 which is not matched is classified into "missing". The undetected frame number increments for the object classified into "missing", and the object with which the undetected frame number has reached the reference value is eliminated from the object data list 135.

<Modification>

The parallax pixel data extraction unit 140 may be configured to provide a time limit of the extraction of parallax pixel data for each of the areas. In such a case, the parallax pixel data extraction unit 140 may be configured to perform the following process.

Figure 32:
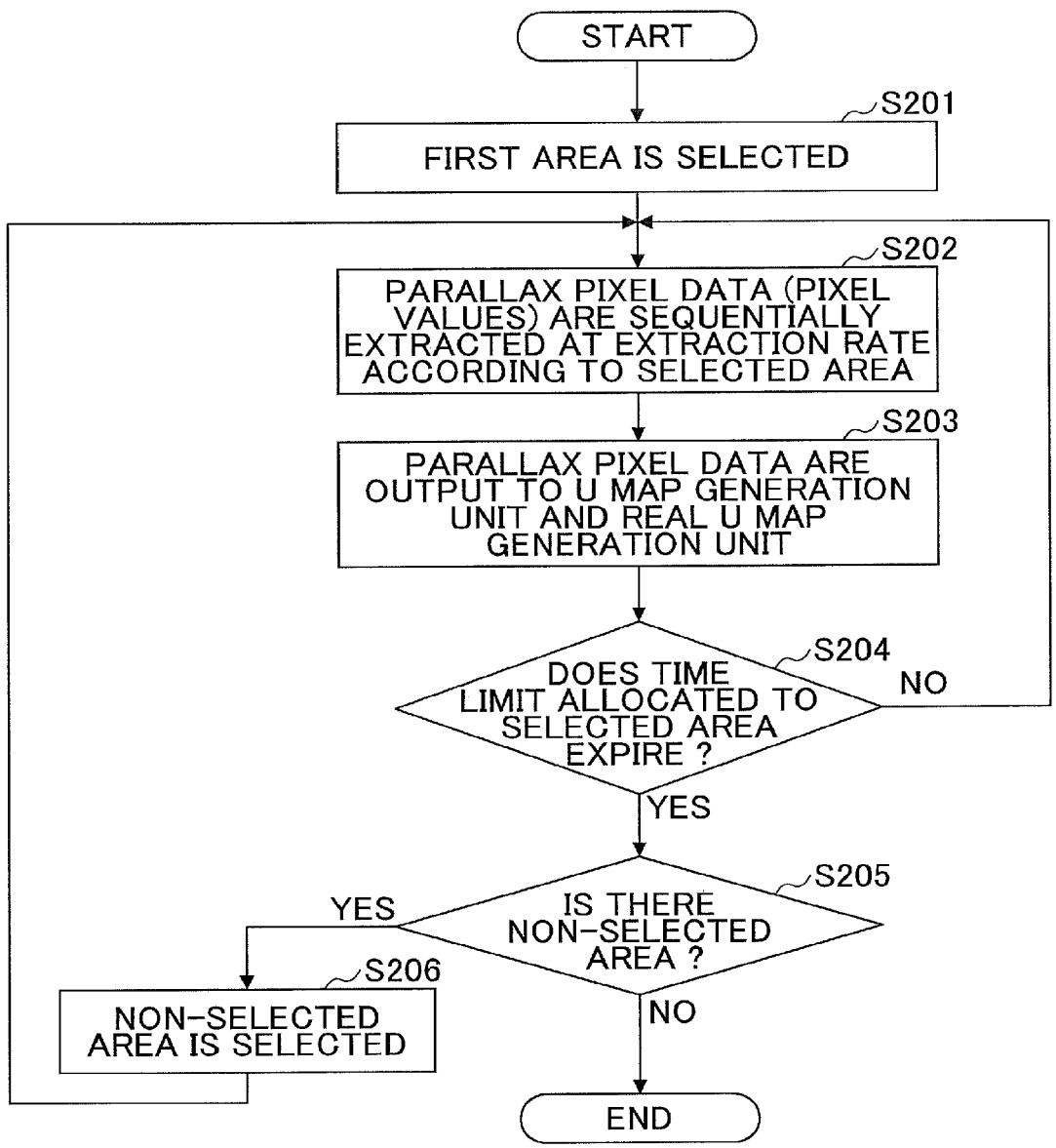
FIG. 32 is a flowchart for explaining a parallax pixel data extraction process with a time limit.

FIG. 32 is a flowchart for explaining a parallax pixel data extraction process with a time limit, which is performed by the parallax pixel data extraction unit 140.

As illustrated in FIG. 32, the parallax pixel data extraction unit 140 selects a first area (step S201).

The parallax pixel data extraction unit 140 extracts the parallax pixel data (pixel value) one by one at an extraction rate associated with the selected area (step S202). The parallax pixel data extraction unit 140 outputs the parallax pixel data to the U map generation unit 141 or the real U map generation unit 142 (step S203).

The parallax pixel data extraction unit 140 determines whether an elapsed time from a start of the extraction of the parallax pixel data from the selected area exceeds a time limit associated with the selected area (step S204).

When the time limit is not exceeded (NO in step S204), the control is returned to the processing of step S202.

When the time limit is exceeded (YES in step S204), the parallax pixel data extraction unit 140 determines whether there is a non-selected area (step S205).

When there is no non-selected area (NO in step S205), the parallax pixel data extraction process is terminated. When there is a non-selected area (YES in step S205), the non-selected area is selected (step S206) and the control is returned to the processing of step S202.

Figure 33:
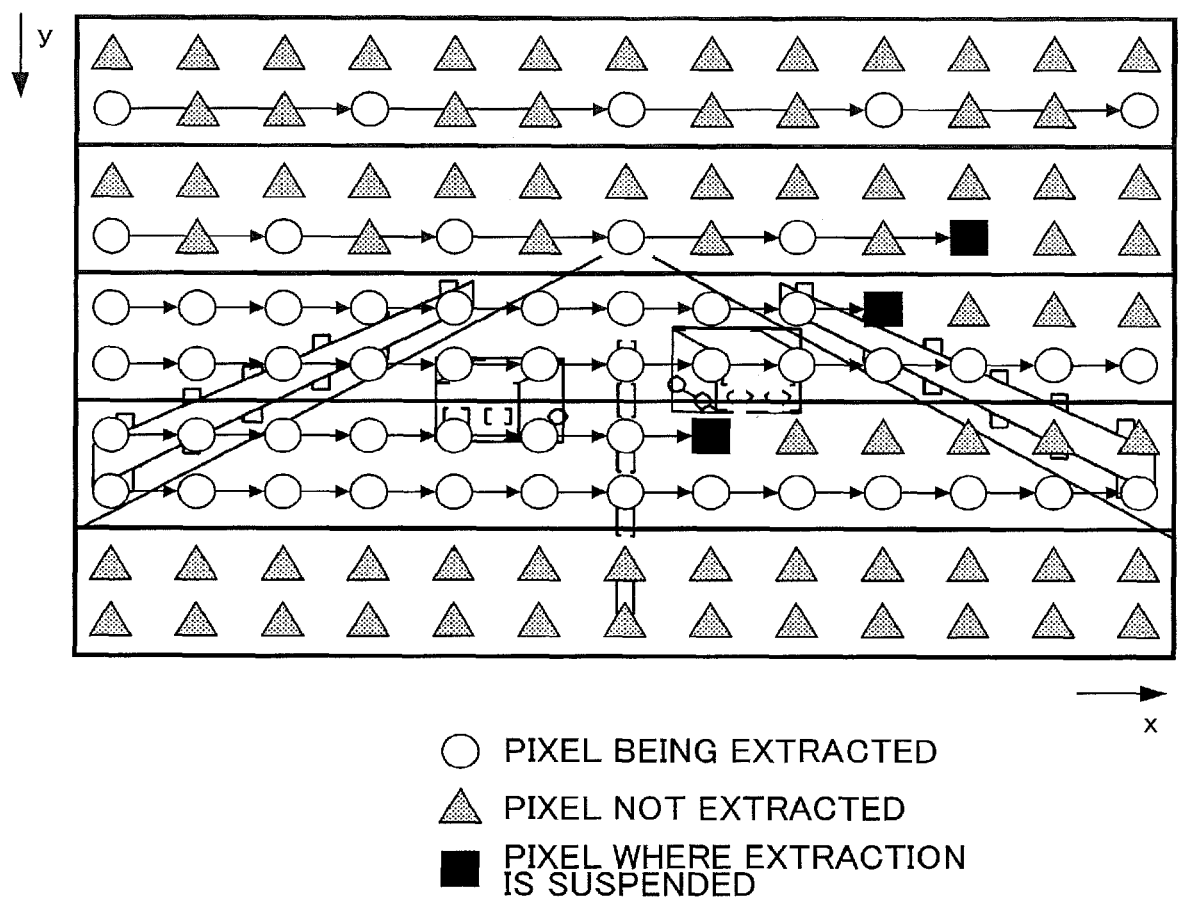
FIG. 33 is a diagram for explaining a process in which the extraction of the parallax pixel data in each area is suspended due to the expiration of a time limit of each area.

FIG. 33 is a diagram for explaining a process in which the extraction of the parallax pixel data in each area is suspended due to the expiration of the time limit of each area. The parallax pixel data extraction unit 140 may be configured to extract parallax pixel data at an extraction rate of each area, and suspend, when the time limit of each area is exceeded, the extraction of the parallax pixel data in the corresponding area. In this case, it is possible to finish the process within the time limit while maintaining the level of accuracy of the measurement.

Further, the parallax pixel data extraction unit 140 may be configured so that a limited extraction number of the parallax pixel data is allocated to each area. In this case, the parallax pixel data extraction unit 140 performs the following process.

Figure 34:
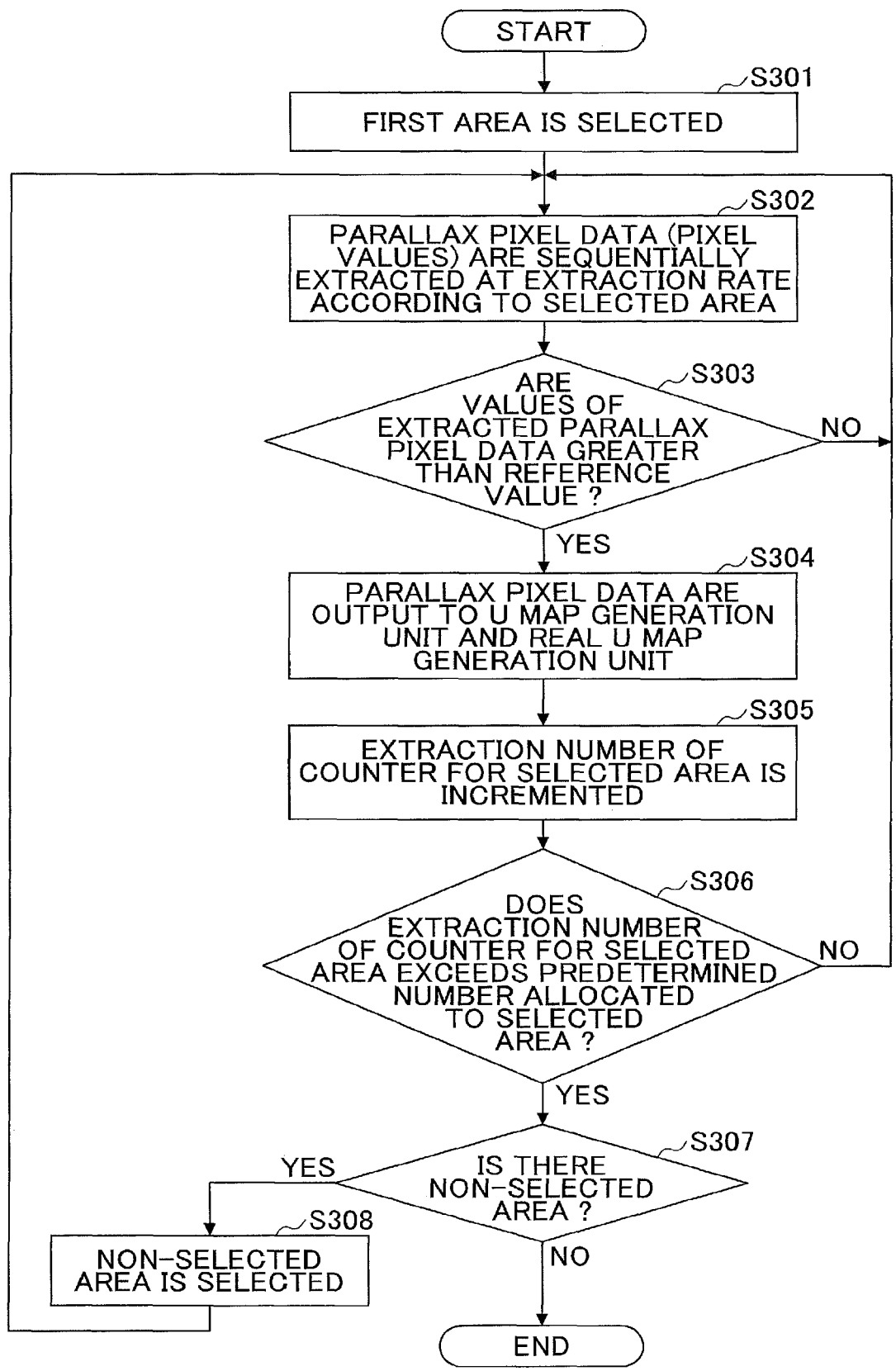
FIG. 34 is a flowchart for explaining a parallax pixel data extraction process with a limited extraction number.

FIG. 34 is a flowchart for explaining a parallax pixel data extraction process with a limited extraction number which is performed by the parallax pixel data extraction unit 140.

As illustrated in FIG. 34, the parallax pixel data extraction unit 140 selects a first area (step S301). For example, at this time, a counter of an extraction number allocated to the first area may be initialized to 0.

The parallax pixel data extraction unit 140 sequentially extracts the parallax pixel data (pixel values) at an extraction rate associated with the selected area (step S302).

The parallax pixel data extraction unit 140 determines whether the values of the extracted parallax pixel data are greater than a predetermined reference value (e.g., 0) (step S303).

When the values are not greater than the reference value (NO in step S303), the control is returned to the processing of step S302.

When the values are greater than the reference value (YES in step S303), the parallax pixel data extraction unit 140 outputs the values of the extracted parallax pixel data to the U map generation unit 141 and the real U map generation unit 142 (step S304). The extraction number of the counter allocated to the selected area is incremented (step S305).

Subsequently, the parallax pixel data extraction unit 140 determines whether the extraction number of the counter allocated to the selected area is greater than a predetermined number allocated to the selected area (step S306).

When the extraction number is not greater than the predetermined number (NO in step S306), the control is returned to the processing of step S302.

When the extraction number is greater than the predetermined number (YES in step S306), the parallax pixel data extraction unit 140 determines whether there is any non-selected area from which the parallax pixel data are not extracted (step S307).

When there is no non-selected area (NO in step S307), the process is terminated.

When there is a non-selected area (YES in step S307), the parallax pixel data extraction unit 140 selects the non-selected area (step S308). After the step S308 is performed, the control is returned to the processing of step S302. In this case, the extraction number of the counter allocated to the newly selected area is initialized to 0.

Further, the parallax pixel data extraction unit 140 may be configured to extract the parallax pixel data at an extraction rate associated with each pixel, instead of extracting the parallax pixel data at an extraction rate associated with each area. In this case, the parallax pixel data extraction unit 140 stores the number of times when the values of the extracted parallax pixel data are not greater than the reference value (e.g., 0) and stores the number of times when the values of the extracted parallax pixel data are greater than the reference value, on a pixel-by-pixel basis. The extraction rate associated with each pixel is computed by dividing the number of times when the values of the extracted parallax pixel data are not greater than the reference value, by the total extraction number. Hence, the parallax pixel data extraction unit 140 extracts the parallax pixel data (pixel values of the respective pixels) at the extraction rate associated with each pixel.

Further, the parallax pixel data extraction unit 140 may be configured to change the rate of extracting the pixel values for each of the areas into which the parallax image data is divided by straight lines parallel to both or either of the vertical (perpendicular) direction and the horizontal direction. In this case, when obstacles or children in the vicinity of the sides of the vehicle 100 are regarded as important objects of detection, the parallax pixel data extraction unit 140 may change the rate of extracting the pixel values to a comparatively great value for the lower right or lower left areas where it is more likely to capture an image of the important objects of detection. The data indicating the parallax distribution of the object generated by the parallax pixel data extraction unit 140 may be two-dimensional histogram information with respect to the axis according to the parallax and the axis according to the horizontal direction of the parallax image. The U map and the real U map described above are examples of such data.

The moving object device control system according to the present disclosure is not limited to the above-described embodiments, and various variations and modifications may be made without departing from the scope of the present disclosure.

For example, the functions of the processing hardware unit 120 and the image analysis unit 102 may be implemented by hardware, or may be implemented by any of the elements and devices illustrated in FIG. 2, which are activated by instructions from the CPU (processor) 123 based on the programs stored in the memory 122. The programs may be stored in an installable or executable file format on a computer-readable recording medium, and the recording medium storing the programs thereon may be distributed. Examples of the recording medium include a compact disc recordable (CD-R), a digital versatile disk (DVD), a Blu-ray disc (BD), etc. Further, the recording medium storing the programs thereon, such as a compact disc read only memory (CD-ROM) or a hard disk (HD) may be supplied domestically or overseas as program products.

As described in the foregoing, according to the present disclosure, when measuring an object using an image obtained from a stereo camera disposed in a vehicle, it is possible to increase the measurement speed while maintaining the level of accuracy of the measurement.

What is claimed is:

1. An image processing apparatus, comprising:
a processor configured to
acquire a parallax image having pixel values according to a parallax of an object in a plurality of captured images,
extract first pixel values from a first area of the parallax image by spatially sampling the first area at a first rate separately set for the first area,
extract second pixel values from a second area of the parallax image by spatially sampling the second area at a second rate separately set for the second area, and
generate data indicating a parallax distribution of the object in the plurality of captured images based on the extracted first and second pixel values,
wherein, in extracting the second pixel values, the processor is further configured to extract the second pixel values from the second area at the second rate when a number of times of extracting from the first area the first pixel values that are greater than or equal to a predetermined reference value exceeds a predetermined number of times associated with the first area.

2. The image processing apparatus according to claim 1, wherein the processor is further configured to obtain the first area and the second area by dividing the parallax image into areas in a horizontal direction or a vertical direction.

3. The image processing apparatus according to claim 1, wherein the processor is further configured to extract the second pixel values from the second area at the second rate when an elapsed time from a start of the extraction of the first pixel values from the first area exceeds a time limit associated with the first area.

4. An imaging device, comprising:
a plurality of imaging units, each including an image sensor; and
control circuitry configured to execute a process, the process including acquiring a parallax image having pixel values according to a parallax of an object in a plurality of captured images obtained by the plurality of imaging units,
extracting first pixel values from a first area of the parallax image at a first rate,
extracting second pixel values from a second area of the parallax image at a second rate, and
generating data indicating a parallax distribution of the object in the plurality of captured images based on the extracted first and second pixel values,
wherein the extracting of the second pixel values includes extracting the second pixel values from the second area at the second rate when a number of times of extracting from the first area the first pixel values which are greater than or equal to a predetermined reference value exceeds a predetermined number of times associated with the first area.

5. A moving object device control system, comprising:
a plurality of imaging units mounted on a moving object to capture a plurality of images in front of the moving object; and
control circuitry mounted on the moving object and configured to execute a process, the process including acquiring a parallax image having pixel values according to a parallax of an object in the plurality of captured images from the plurality of imaging units,
extracting first pixel values from a first area of the parallax image at a first rate,
extracting second pixel values from a second area of the parallax image at a second rate,
generating data indicating a parallax distribution of the object in the plurality of captured images based on the extracted first and second pixel values, and
performing traveling support control of the moving object based on the parallax distribution of the moving object indicated by the generated data,
wherein the extracting of the second pixel values includes extracting the second pixel values from the second area at the second rate when a number of times of extracting from the first area the first pixel values which are greater than or equal to a predetermined reference value exceeds a predetermined number of times associated with the first area.

6. The moving object device control system according to claim 5, wherein
the processor is further configured to obtain the first area and the second area by dividing the parallax image in a horizontal direction,
the first area is nearer to a center of the parallax image than the second area, and
the first rate is greater than the second rate.

7. The moving object device control system according to claim 6, wherein
the processor is further configured to extract third pixel values from a third area of the parallax image by spatially sampling the third area at a third rate separately set for the third area,
the second area is located above the first area in a vertical direction,
the third area is located below the first area in the vertical direction, and
the third rate is less than the second rate.

8. A frequency distribution image generation method executed by a processor of an image processing apparatus, the method comprising:
acquiring a parallax image having pixel values according to a parallax of an object in a plurality of captured images;
extracting first pixel values from a first area of the parallax image by spatially sampling the first area at a first rate separately set for the first area;
extracting second pixel values from a second area of the parallax image by spatially sampling the second area at a second rate separately set for the second area; and
generating data indicating a parallax distribution of the object in the plurality of captured images based on the extracted first and second pixel values,
wherein the extracting of the second pixel values includes extracting the second pixel values from the second area at the second rate when a number of times of extracting from the first area the first pixel values that are greater than or equal to a predetermined reference value exceeds a predetermined number of times associated with the first area.

9. A non-transitory computer-readable recording medium storing a program which, when executed by a processor of an image processing apparatus, causes the processor to perform a process comprising:

acquiring a parallax image having pixel values according to a parallax of an object in a plurality of captured images;

extracting first pixel values from a first area of the parallax image by spatially sampling the first area at a first rate;

extracting second pixel values from a second area of the parallax image by spatially sampling the second area at a second rate; and generating data indicating a parallax distribution of the object in the plurality of captured images based on the extracted first and second pixel values, wherein the extracting of the second pixel values includes extracting the second pixel values from the second area at the second rate when a number of times of extracting from the first area the first pixel values that are greater than or equal to a predetermined reference value exceeds a predetermined number of times associated with the first area.

10. The image processing apparatus of claim 1, wherein the processor is further configured to extract the first pixel values from the first area at the first rate by extracting values from only a first predetermined fraction of the pixels in the first area.

11. The image processing apparatus of claim 1, wherein the processor is further configured to sample the first and second areas at the first rate and the second rate, respectively, the first rate being different than the second rate.

* * * * *